US010725865B2

(12) United States Patent
Okada et al.

(10) Patent No.: US 10,725,865 B2
(45) Date of Patent: Jul. 28, 2020

(54) STORAGE UNIT AND STORAGE DEVICE

(71) Applicant: HITACHI, LTD., Tokyo (JP)

(72) Inventors: Mitsuhiro Okada, Tokyo (JP); Akifumi Suzuki, Tokyo (JP); Satoshi Morishita, Tokyo (JP); Akira Yamamoto, Tokyo (JP)

(73) Assignee: HITACHI LTD., Tokyo (JP)

( * ) Notice: Subject to any disclaimer, the term of this patent is extended or adjusted under 35 U.S.C. 154(b) by 138 days.

(21) Appl. No.: 15/548,635

(22) PCT Filed: Feb. 25, 2015

(86) PCT No.: PCT/JP2015/055312
§ 371 (c)(1),
(2) Date: Aug. 3, 2017

(87) PCT Pub. No.: WO2016/135872
PCT Pub. Date: Sep. 1, 2016

(65) Prior Publication Data
US 2018/0018231 A1 Jan. 18, 2018

(51) Int. Cl.
G06F 11/00 (2006.01)
G06F 11/10 (2006.01)
G06F 3/06 (2006.01)
(52) U.S. Cl.
CPC .......... G06F 11/1076 (2013.01); G06F 3/061 (2013.01); G06F 3/064 (2013.01);
(Continued)
(58) Field of Classification Search
CPC ............... G06F 11/1008; G06F 11/108; G06F 11/1076; G06F 3/061; G06F 3/0619;
(Continued)

(56) References Cited

U.S. PATENT DOCUMENTS 7,827,351 B2 * 11/2010 Suetsugu ............ G06F 11/1092
711/114
7,970,995 B2 * 6/2011 Watanabe ........... G06F 11/1076
711/114

(Continued)

FOREIGN PATENT DOCUMENTS

JP  2007-094994 A  4/2007
JP  2010-108246 A  5/2010

(Continued)

OTHER PUBLICATIONS

International Search Report for WO 2016/135782 A1, Apr. 28, 2015.

Primary Examiner — Albert Decady
Assistant Examiner — Osman M Alshack
(74) Attorney, Agent, or Firm — Volpe and Koenig, P.C.

(57) ABSTRACT

A storage unit includes a plurality of storage devices that form a RAID group, that are coupled to the same bus, and that communicate with each other. Each of the plurality of storage devices includes a device controller and a storage medium. The plurality of storage devices store each of data and parities generated on the basis of the data, the data and the parities being included in RAID stripes. A first device controller of a first storage device included in the RAID group transmits, to the plurality of storage devices included in the RAID group other than the first storage device, an instruction to transfer the data and/or the parities included in the RAID stripes and restores the data or the parity corresponding to the first storage device of the RAID stripes on the basis of the transferred data and the transferred parities.

15 Claims, 20 Drawing Sheets

(52) U.S. Cl.
CPC .......... *G06F 3/0619* (2013.01); *G06F 3/0659* (2013.01); *G06F 3/0689* (2013.01)

(58) Field of Classification Search
CPC ...... G06F 3/064; G06F 3/0659; G06F 3/0689; G06F 11/1092; G11B 20/1833
USPC ......................................... 714/763, 764, 770
See application file for complete search history.

(56) References Cited

U.S. PATENT DOCUMENTS

| | | | | |
|---|---|---|---|---|
| 8,037,245 | B2* | 10/2011 | Kitamura | G06F 11/1076 711/114 |
| 9,047,220 | B2* | 6/2015 | Akutsu | G06F 11/1092 |
| 2007/0088976 | A1 | 4/2007 | Daikokuya et al. | |
| 2008/0256292 | A1* | 10/2008 | Flynn | G06F 12/123 711/114 |
| 2009/0307420 | A1* | 12/2009 | Tanimoto | G06F 11/1076 711/114 |
| 2010/0115183 | A1* | 5/2010 | Araki | G06F 12/0246 711/103 |
| 2011/0231605 | A1* | 9/2011 | Ogawa | G06F 3/061 711/114 |
| 2012/0254513 | A1* | 10/2012 | Uehara | G06F 3/0616 711/103 |
| 2013/0047028 | A1* | 2/2013 | Daikokuya | G06F 11/0727 714/6.3 |
| 2013/0054907 | A1* | 2/2013 | Ikeuchi | G06F 11/1092 711/159 |
| 2013/0132641 | A1* | 5/2013 | Suzuki | G06F 12/0246 711/103 |
| 2013/0262750 | A1* | 10/2013 | Yamasaki | G06F 3/0611 711/103 |
| 2013/0290773 | A1* | 10/2013 | Yoshihara | G06F 12/0246 714/6.21 |
| 2014/0337665 | A1* | 11/2014 | Ogihara | G06F 11/1092 714/6.21 |
| 2016/0246518 | A1* | 8/2016 | Galbraith | G06F 11/1096 |

FOREIGN PATENT DOCUMENTS

| | | |
|---|---|---|
| JP | 2010-224803 A | 10/2010 |
| JP | 2013-117922 A | 6/2013 |
| WO | 2009/130848 A1 | 10/2009 |

* cited by examiner

| RAID group # | RAID level | RAID configuration | Stripe size | Device # | Device offset | Device size |
|---|---|---|---|---|---|---|
| 0 | RAID5 | 3D1P | 16KB | 0 | 0x0000_0000 | 0xFEF_FFFF |
| | | | | 1 | 0x1000_0000 | 0xFEF_FFFF |
| | | | | 2 | 0x2000_0000 | 0xFEF_FFFF |
| | | | | 3 | 0x3000_0000 | 0xFEF_FFFF |
| ... | ... | ... | ... | ... | ... | ... |

810

811 — RAID group #
812 — RAID level
813 — RAID configuration
814 — Stripe size
815 — Device #
816 — Device offset
817 — Device size

| Device LBA | PBA |
|---|---|
| 0x0000_0000 | 0x0000_0010 |
| 0x0000_0001 | 0x0000_0001 |
| 0x0000_0002 | 0x0000_0002 |
| 0x0000_0003 | 0x0000_0200 |
| 0x0000_0004 | Unallocated |
| 0x0000_0005 | 0x0001_0000 |
| : | : |
| 0x0FEF_FFFE | Unallocated |
| 0x0FEF_FFFF | Unallocated |

710 / 711 / 712

STORAGE UNIT AND STORAGE DEVICE

TECHNICAL FIELD

The present invention relates to a storage unit and a storage device.

BACKGROUND ART

In recent years, as a storage device mounted on a storage unit, a storage device, which is accessible at higher speed than a HDD (Hard Disk Drive), represented by an SSD (Solid State Drive) in which a NAND-type flash memory (FM) is used as a storage medium, has been spread. Further, a storage device including a semiconductor storage medium, which is accessible at higher speed than a flash memory, such as a ReRAM (Resistance Random Access Memory) or a PCM (Phase Change Memory) is developed for practical use.

In most of storage units, availability of a system is increased using a RAID (Redundant Array of Inexpensive/Independent Disks) technique. The RAID technique is a technique in which a controller (a storage controller) of a storage unit generates redundant data such as parities from write data received from a host apparatus such as a host computer and distributedly stores the write data and the parities respectively in different storage devices. By adopting the RAID technique, even when a failure occurs in a part of the storage devices and data cannot be read from the storage device, the data can be restored using information stored in the other storage devices.

For example, PTL 1 discloses a technique in which, when one of storage devices breaks down, a storage controller reads data and parities from the storage devices other than the broken-down storage device and the storage controller restores the data and writes the restored data in a new storage device.

CITATION LIST

Patent Literature

[PTL 1] Japanese Patent Application raid-Open No. 2007-94994

SUMMARY OF INVENTION

Technical Problem

When a rebuild process described in PTL X is performed, processing occurs in which the storage controller reads data/parities from a plurality of storage devices, restores the data, and writes the restored data in a new storage device. Since data concentrates on the storage controller, there is a problem in that a load on the storage controller is large and performance during rebuilding is deteriorated.

For example, when the load on the storage controller is high, normal 10 process performance is deteriorated. In particular, although an SSD is accessible at high speed compared with a HDD, when the storage controller is a bottleneck, the performance of the SSD cannot be utilized and the performance of a storage unit is deteriorated.

Solution to Problem

A storage unit includes a plurality of storage devices that form a RAID group, that are coupled to the same bus, and that communicate with each other. Each of the plurality of storage devices includes a device controller and a storage medium that stores data. The plurality of storage devices store each of multiple pieces of data and parities generated on the basis of the multiple pieces of data, the multiple pieces of data and the parities being included in RAID stripes. A first device controller of a first storage device included in the RAID group transmits, to the plurality of storage devices included in the RAID group other than the first storage device, an instruction to transfer the multiple pieces of data and/or the parities included in the RAID stripes and restores the data or the parity corresponding to the first storage device of the RAID stripes on the basis of the transferred multiple pieces of data and the transferred parities.

Advantageous Effects of Invention

According to the present invention, since transfer of post-restoration data in a data restoration process is unnecessary, the number of times of transfer of the data is reduced and the data restoration process is increased in speed. Since a load at the time when the storage controller performs the data restoration process can be reduced, it is possible to improve the performance of the storage unit that is executing the data restoration process.

BRIEF DESCRIPTION OF DRAWINGS

FIG. 5 shows RAID configuration information.
FIG. 9 shows an address conversion table of the storage device.

DESCRIPTION OF EMBODIMENTS

Figure 1:
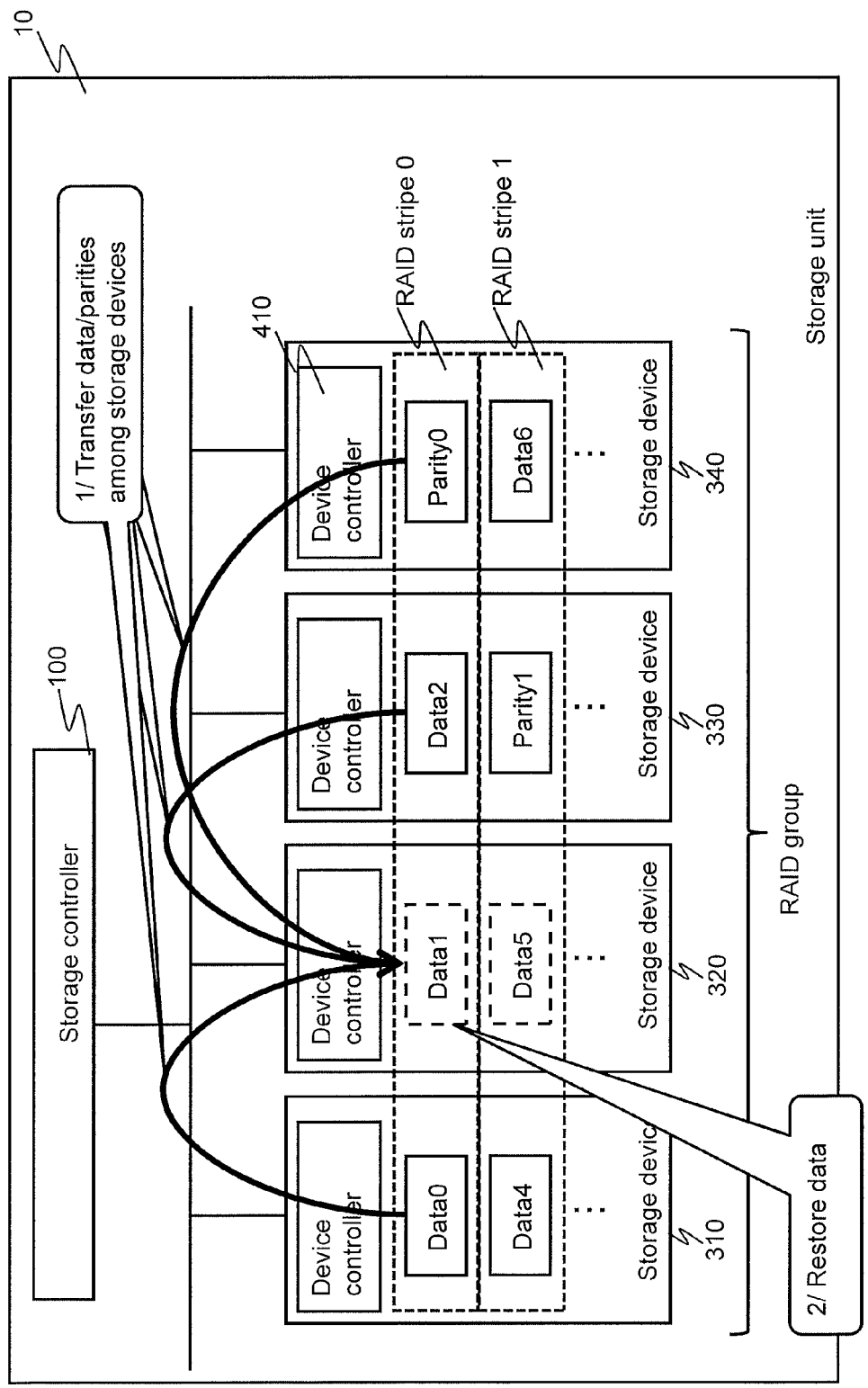
FIG. 1 shows an overview of an embodiment.

FIG. 1 shows an overview of an embodiment. A storage unit 10 includes a storage controller 100 and storage, devices 310 to 340. The storage devices 310 to 340 are coupled to the same bus to be capable of communicating with one another.

The storage controller 100 receives a read request or a write request from a computer on the outside of the storage unit 10 and accesses the storage devices according to the request.

Each of the storage devices 310 to 340 includes a device controller 310 and a storage medium (not shown in the figure). The device controller 410 stores data received from an apparatus on the outside of the storage device in the storage medium. The device controller 410 reads data from the storage medium and transfers the data to the apparatus on the outside of the storage device. The storage medium is a nonvolatile semiconductor memory, for example, a flash memory.

In this embodiment, it is assumed that a RAID group of a RAID 5 (3 Data+1 Parity) is configured on the basis of four storage devices. In the RAID 5, parity is generated according to a predetermined rule for each of RAID stripes. In a RAID stripe 0, Parity 0 is generated on the basis of Data 0, Data 1, and Data 2. For example, the Parity 0 is generated by an exclusive OR operation (hereinafter XOR operation) of the Data 0, the Data 1, and the Data 2. The Data 0, the Data 1, the Data 2, and the Parity 0 are distributedly stored in the storage devices 310 to 340 one by one. When the Data 1 cannot be read because of, for example, a failure of the storage device, the Data 1 is restored by the XOR operation of the Data 0, the Data 2, and the Parity 0. The restoration of data may be referred to as generation of data.

A process of the data restoration in this embodiment is explained. In this embodiment, the device controller 410 includes a function of the XOR operation. When the Data 1 belonging to the RAID stripe 0 is restored, the device controller 410 of the storage device 320 instructs the other storage devices 310, 330, and 340 in the RAID group to transfer the data and the parity belonging to the RAID stripe 0. The device controller 410 of the storage device 320 executes the XOR operation of the transferred Data 0, Data 1, and Parity 0 and restores the Data 1.

Therefore, since the storage device can restore data if data and parity data necessary for the data restoration are transferred to the storage device, transfer of the data after the restoration is unnecessary. Consequently, a restoration process for the data is increased in speed. It is possible to perform the restoration of the data without, imposing a load on the storage controller 100. The performance of the storage unit is improved by reducing the load on the storage controller 100.

The configuration of the storage unit is explained with reference to FIGS. 2 to 5.

Figure 2:
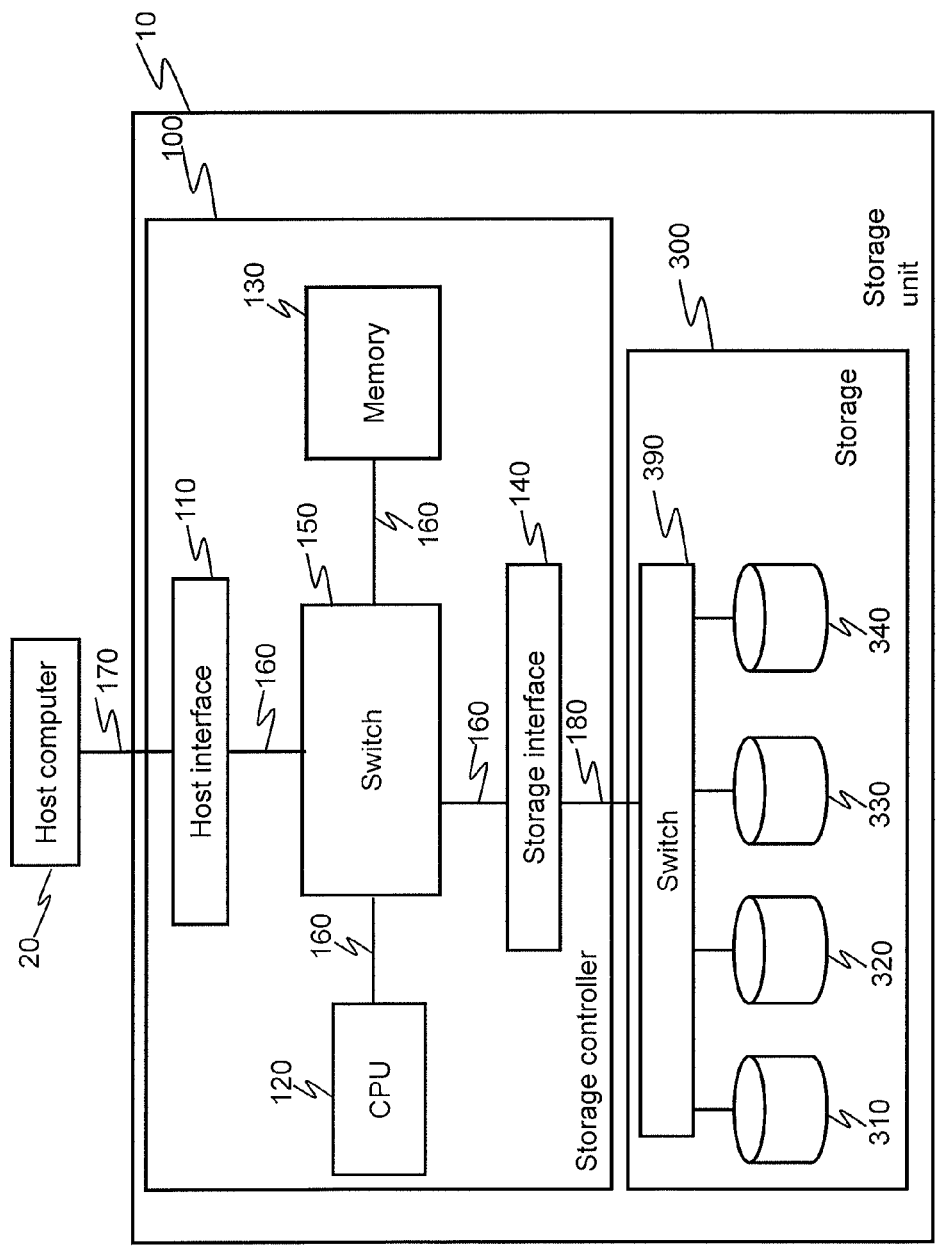
FIG. 2 shows a physical configuration of a storage system.

FIG. 2 is an example of a physical configuration of a storage system according to the embodiment of the present invention. In the storage system, a host computer (hereinafter, host) 20 is coupled to the storage unit 10. The storage unit 10 and the host 20 are capable of communicating via a network 170. The network 170 is, for example, a SAM (rage Area Network) or a LAN (Local Area Network).

The storage unit 10 includes a storage 300 and the storage controller 100 coupled to the storage 300. The storage 300 includes a plurality of storage devices (e.g., SSDs) 310 to 340 and a switch 390 coupled to the respective plurality of storage devices 310 to 340 by an internal bus (e.g., a PCI-Express (PCIe) bus). The plurality of storage devices 310 to 340 are coupled to one another via the switch 390. End-to-End communication is possible among the storage devices. Each of the plurality of storage devices 310 to 340 is coupled to the storage controller 100 via the switch 390. The storage controller 100 may be a router or the like that allocates read/write requests to the storage devices.

The storage controller 100 includes a host interface 110, which is a device that performs communication with the host 20, a CPU (Central Processing Unit) 120 that performs operation control of the entire storage unit 10, a memory 130 that temporarily stores storage management information used by the CPU 120 during data transfer, data written from the host 20, and data read from the storage 300, a storage interface 140, which is a device that performs communication with the storage 300, and a switch 150 coupled to the forgoing through internal buses (e.g., PCI-Express (PCIe) buses or AXI (Advanced extensible Interface) buses) 160. The same reference numeral is affixed to all the internal buses 160. However, the internal buses may be configured by buses of the same bus standard or may include buses of different bus standards. The storage interface 140 in the storage controller 100 is coupled to a plurality of storage devices 300 via a PCIe bus 180.

The storage controller 160 provides a VOL (logical volume) to the host 20. As the VOL in this embodiment, a VOL that constructs a RAID group with the plurality of storage devices 310 to 340 is assumed. The storage controller 100 receives an access request including access destination information from the host 20. The access request is, for example, a read request or a write request. Data conforming to the access request is read target, data read from the VOL according to the read request or write target data written in the VOL according to the write request. The access destination information includes, for example, an ID of a VOL of an access destination (a read source or a write destination) and a logical address (a host LBA (Logical Block Address)) of the access destination of the VOL.

In this embodiment, an example at the time when the RAID 5 (3 Data+1 Parity) is constructed using the four storage devices 310 to 340 is explained.

Figure 20:
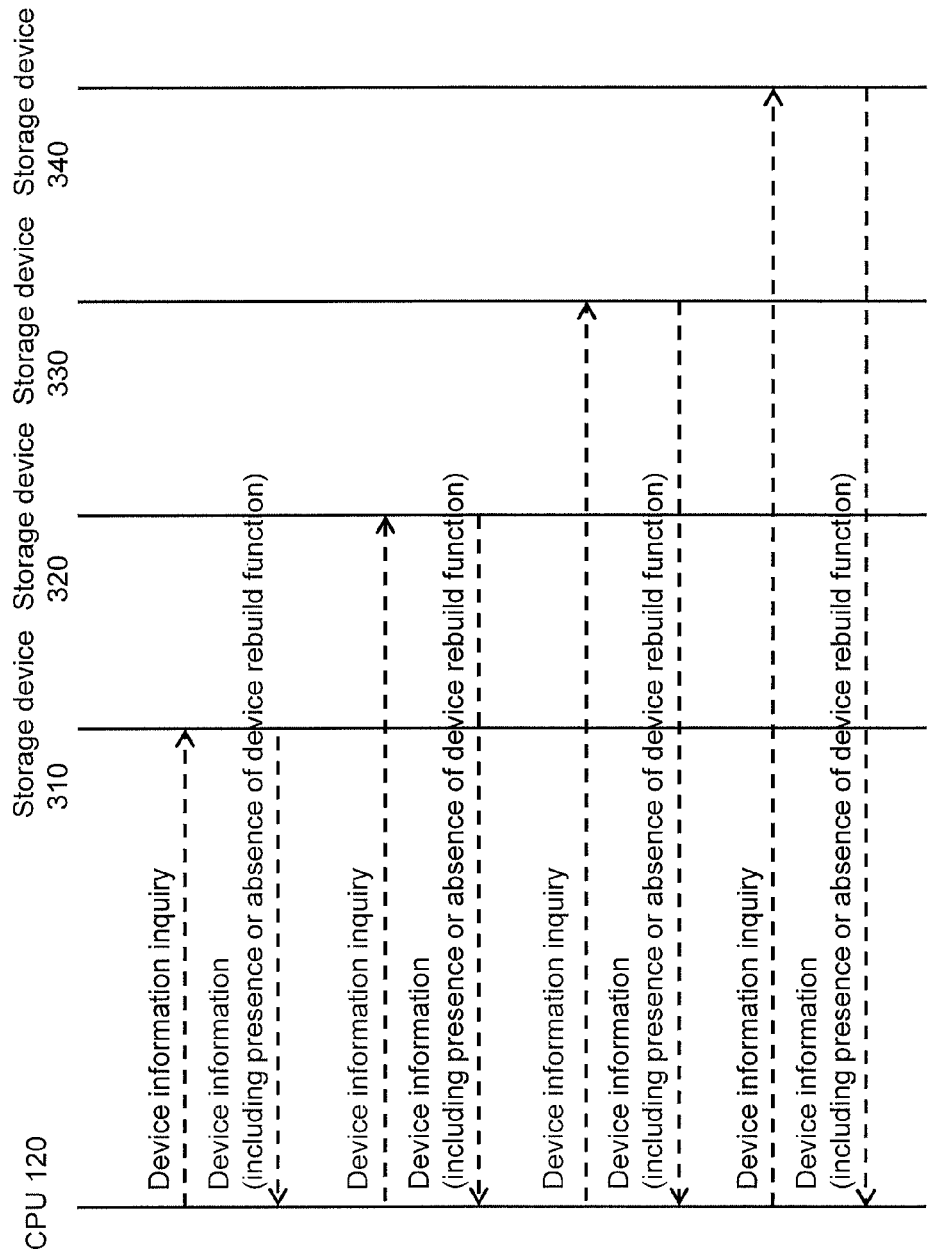
FIG. 20 shows an initialization sequence.

An initialization sequence in this embodiment is shown in FIG. 20. As shown in FIG. 20, during initialization, the CPU 120 inquires the respective storage devices 310 to 340 about "presence or absence of a rebuild function" besides device information (e.g., a logical storage space size and a communication space size). The storage devices 310 to 340 transmit the logical storage space size, the communication space size, and the presence or absence of the rebuild function to the CPU 120 in response to the inquiry from the CPU 120.

The presence or absence of the rebuild function is a flag indicating whether the rebuild function corresponds to a rebuild process method described in embodiments 1 to 3 below. The rebuild process of the present invention is enabled when a response of rebuild function "present" is received from all of the storage devices 310 to 340 configuring the RAID group. The CPU 120 transmits RAID configuration information 810 explained below to the storage devices 310 to 340.

Consequently, when at least one storage device not having the rebuild function is present in the RAID group, the function of this embodiment can be turned off and the storage controller 100 can perform the rebuild process as usual.

Figure 3:
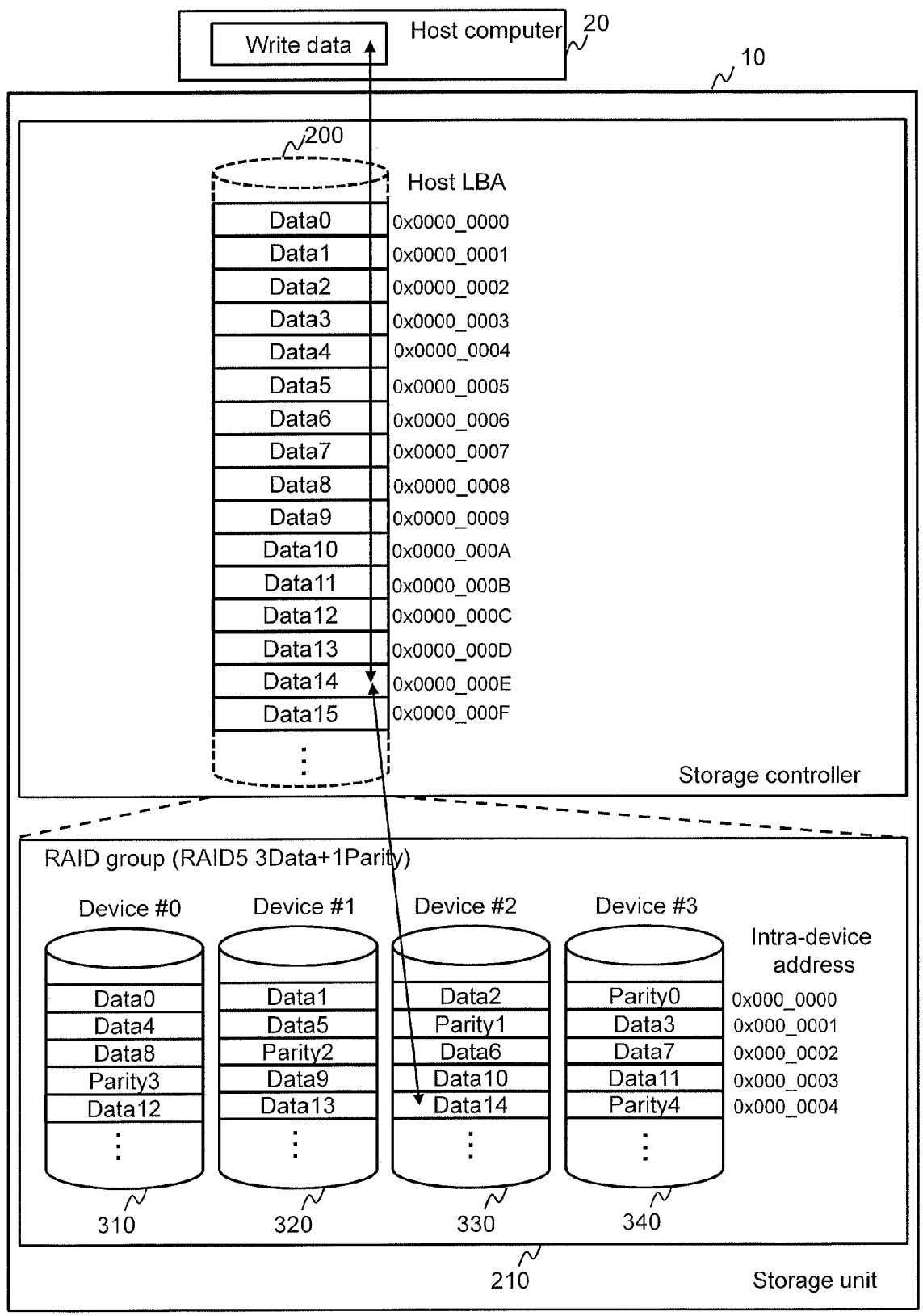
FIG. 3 shows a correspondence relation between a logical volume and a RAID group (a RAID 5).

A relation between a VOL 200 and a RAID group 210 in this embodiment is shown in FIG. 3. The VOL 200 is seen from the host 20. In this embodiment, since the host LBA is managed in a 16 KB unit, all of the Data 0, the Data 1, and the like are data of 16 KB. Device numbers of the four storage devices 310 to 340 are respectively 0, 1, 2, and 3. A device number and an intra-device address of the RAID group 210 can be uniquely determined according to the following calculation using a value of the host LBA. Specifically, the device number is a remainder obtained by dividing the value of the host LBA by 4, which is the number of devices of the RAID group. The intra-device address can be calculated as a value (fractions omitted) obtained by dividing the value of the host LBA by 3, which is the number of data in a RAID stripe. The RAID stripe indicates one integrated unit of the Data 0, the Data 1, and the Data 2 and parity data obtained by performing the XOR operation of 16 KB of the Data 0 to 2 for each of bits.

As a specific example, an example is explained in which write data of the host 20 is written in the host LBA "0x0000_000E" of the VOL 200. In this case, the device number is 2, which is a remainder of 14÷4, and the infra-device address is 4 calculated by 14÷3 with fractions omitted. If the number of devices of the RAID group and the number of data per. RAID stripe are seen, it is possible to uniquely calculate the device number and the intra-device address.

When the write data is written, parity in the RAID stripe corresponding to the write data is updated. When Data 14 is updated, Parity 4 after the update is generated by the XOR operation of three of pre-update data, post-update data, and the Parity 4 before the update by the write data.

Figure 4:
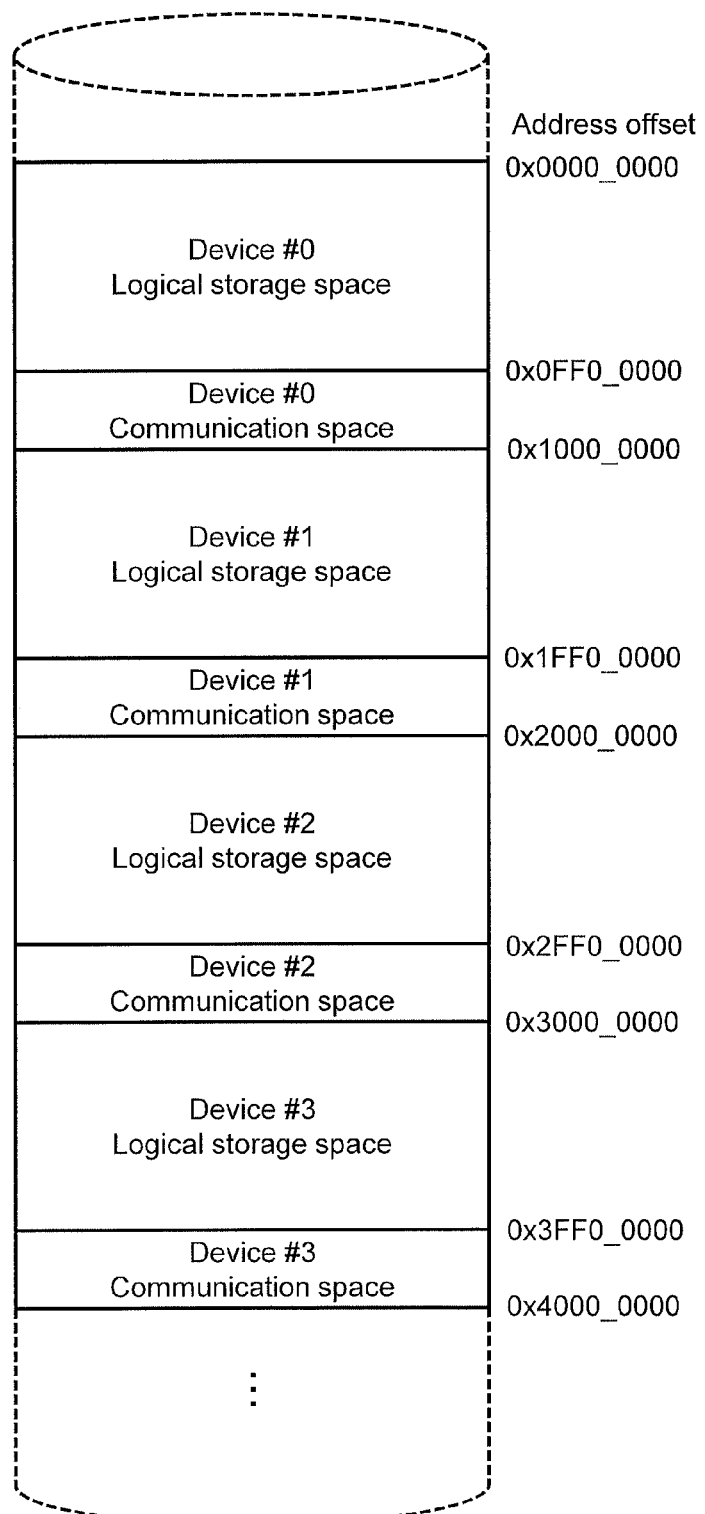
FIG. 4 shows an address map of a PCIe bus.

An example of an address map of a PCIe bus is shown in FIG. 4. The address map is created as explained below. First, during initialization of a storage device or when the storage controller 100 recognizes a storage device anew, the storage controller 100 inquires storage devices what kind of an address space is configured. The storage devices respond to the storage controller 100 with a range of an address space (an infra-device address) and sizes of a logical storage space and a communication space. The storage controller 100 configures an address offset and creates an address map such that the storage devices can be respectively identified on the logical storage space using a result of the response. The storage controller 100 configures the address map in a route complex (the storage interface 140) of the PCIe and the switch 390. For example, the address map is stored in a memory in the switch. Consequently, it is possible to uniquely identify addresses of the storage devices in a storage unit including a plurality of storage devices. The switch 390 is capable of routing a packet to as address corresponding to the switch 390.

In FIG. 4, as address offsets of logical storage spaces of the devices #0 to #3, "0x0000_0000", "0x1000_0000", "0x2000_0000", and "0x3000_0000" are respectively configured and, as address offsets of communication spaces of the devices #0 to #3, "0x0FF0_0000", "0x1FF0_0000", "0x2FF0_0000", and "0x3FF0_0000" are respectively configured. In the communication spaces, a part or all of registers of processors 415 and data buffers 416 of the storage devices 310 to 340 are mapped. By using addresses of the communication spaces, it is possible to communicate exchange of control information with the storage controller 100, storage of data read from other recording devices, and the like.

RAID configuration information 810 configured by the storage controller 100 in order to access the storage devices is shown in FIG. 5. The RAID configuration information 810 is stored in the memory 130 of the storage unit 10.

A RAID group #811 is Information for uniquely identifying a RAID group in the storage unit 10. A RAID level 812 indicates a scheme of RAID control of the RAID group. RAID levels are, for example, RAID 1, RAID 5, RAID 6, and RAID 10. A RAID configuration 813 indicates the number of data and the number of parities in a RAID stripe in the RAID group. For example, when three storage devices store data and one storage device stores parity with respect to one RAID stripe, a RAID configuration is represented as "3D1P". A stripe size 814 is a size per one each of data and parities in the RAID stripe. A device #815 is information for uniquely identifying a device in the RAID group. When a plurality of storage devices are used as one logical storage space, a device offset 816 indicates start positions of addresses of the storage devices in the logical address space. A device size 817 indicates a size of a logical storage space of a storage device. An address space for the device size 817 from the device offset. 816 is accessible logical storage spaces in the storage devices.

The storage controller 100 cannot distinguish a storage device only with the intra-device address. Therefore, by configuring an address offset for each of device numbers and using a value (a device LBA) obtained by adding the intra-device address to the address offset, it is possible to uniquely access a storage area of any storage device among the storage devices 310 to 340 coupled to the PCIe bus. In the present invention, during initialization or when a device is recognized anew, the RAID configuration information 810 including all kinds of information of storage devices present in the same RAID group and communication space information necessary for exchanging read/write commands are notified to all storage devices in the RAID group. In this embodiment, the communication space information is addresses in a communication space of the storage devices. Consequently, the storage devices are capable of accessing other storage devices in the RAID group.

The RAID configuration information 810 may include information indicating whether the storage devices are executing the rebuild process.

In this embodiment, as the RAID configuration information 810, examples of the RAID group #811, the RAID level 812, the RAID configuration 813, the stripe size 814, the device #, the device offset 816, and the device size 817 are described. However, the RAID configuration information 810 is not limited to these kinds of information. The RAID configuration information 810 only has to be information with which the storage devices including the rebuild function described in the first to third embodiments can instruct, in order to perform the rebuild process, the other storage devices to transfer data or parities. For example, the storage controller 100 may notify a device start address and a device end address instead of the device offset 816 and the device size 817. As explained below in an example in which SAS is used as a bus, the storage controller 100 may notify a device address and a device size for identifying a device. In this embodiment, the device offset 816 and the device size 817, the device start address and the device end address, and the device address and the device size are information for uniquely identifying storage areas of a respective plurality of storage devices and are referred to as storage device identification information.

The configuration of the storage device is explained with reference to FIGS. 6 to 9. In this embodiment, since the storage devices 310 to 340 having the same function are used as the storage devices, the storage device 310 is explained as an example.

Figure 6:
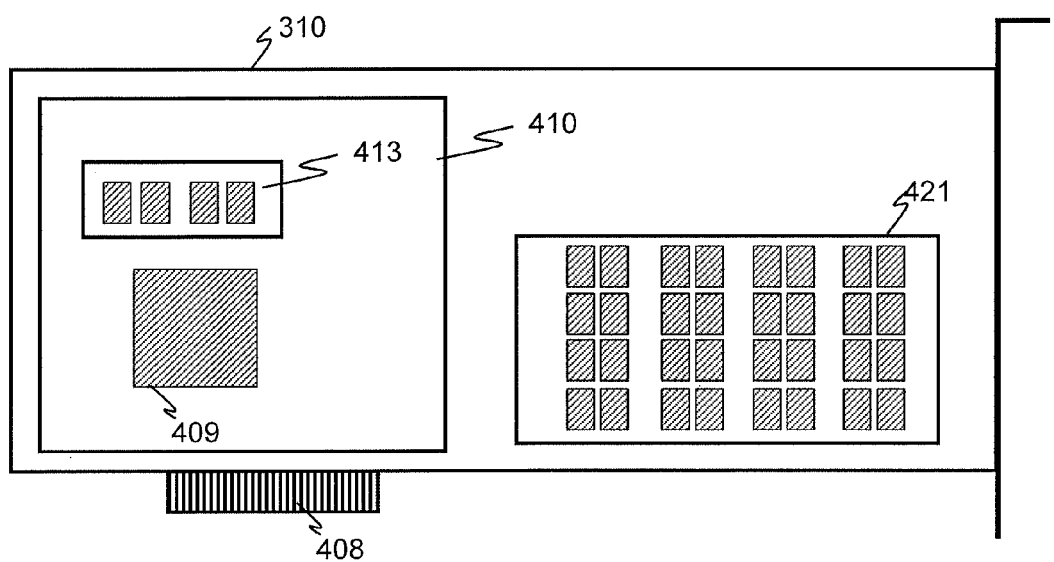
FIG. 6 shows the exterior of a storage device.

FIG. 6 shows the exterior of the storage device 310. FIG. 6 shows art image at the time when the storage device is mounted in a shape of a PCIe card. In the figure, the entire exterior corresponds to the storage device and includes the device controller 410. In the device controller 410, a hardware logic 409 is implemented as an LSI (including forms of an FPGA and an ASIC). The device controller 410 includes a RAM 413 as well. Besides, a flash memory (FM)

421 is implemented in the card. The card is coupled to an external apparatus through a card edge 408. Specifically, a PCIe core is implemented in the LSI. A signal line is wired toward the card edge 408. Note that the card edge 408 may have a connector shape. Although not shown in the figure, a battery or a super capacitor playing a role equivalent to the battery is sometimes mounted in order to protect volatilization of the RAM 413 of the apparatus.

In this embodiment, the storage medium is a flash memory. However, the storage medium may be a phase change memory (PCM), a magnetoresistive random access memory (MRAM), a resistance random access memory (ReEAM), or a ferroelectric random access memory (Fe-RAM), or the like, which is a nonvolatile semiconductor memory of another type.

Figure 7:
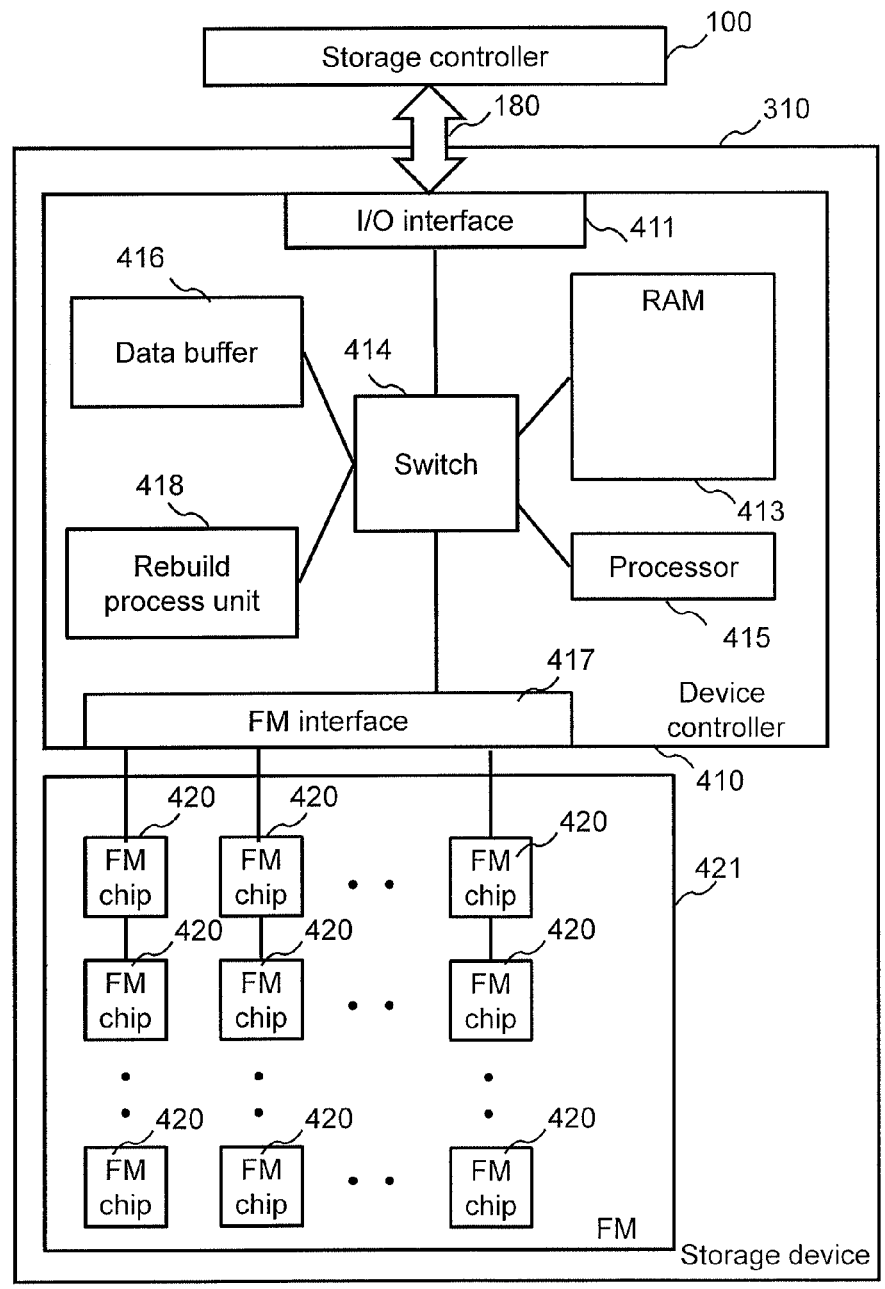
FIG. 7 shows 3 physical configuration of the storage device.

FIG. 7 is a configuration example of the storage device 310.

The storage device 310 includes the FM 421, which is a storage medium, and the device controller 410. The device controller 410 is coupled to the FM 421. The device controller 410 controls accesses to the FM 421 such as read/write of data.

Figure 8:
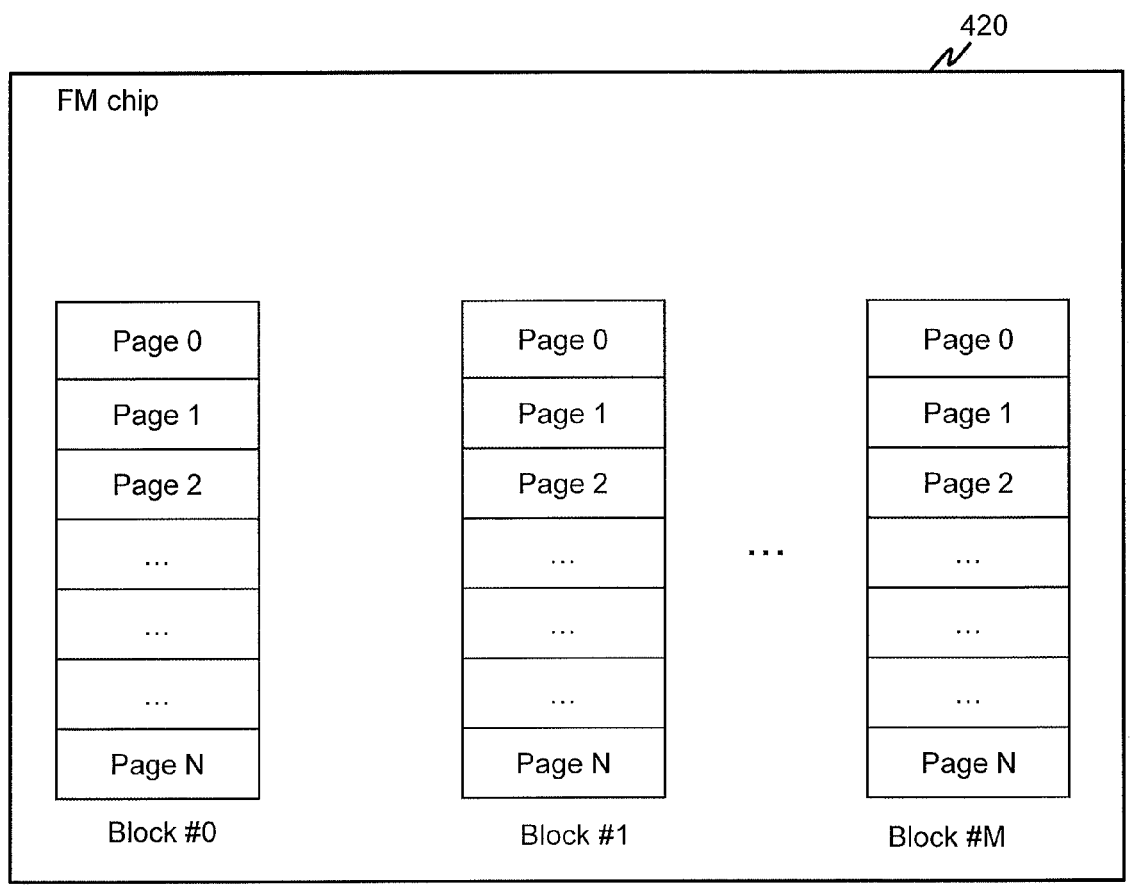
FIG. 8 shows the configuration of an FM chip.

The FM 421 is configured by a plurality of (e.g., thirty-two) FM chips 420. The FM 421 is, for example, an FM of a HAND type. As shown in FIG. 8, the FM chips 420 include pluralities of blocks (physical blocks). The blocks include pluralities of pages (physical pages). In the FM 421, data is erased in a block unit, and read/written in a page unit. In this embodiment, the page unit is explained as 16 KB. However, since pages are different depending on the FM chips 420 in use. Therefore, the size of the pages is not limited.

The device controller 410 includes the RAM (Random Access Memory) 413, a rebuild process unit 410, the data buffer 416, an I/O interface 411, an FM interface 417, the processor 415, and a switch 414 that relays data transfer among the foregoing.

The RAM 413 is, for example, a DRAM (Dynamic Random Access Memory). The RAM 413 mainly stores FM management information. The FM management information may be stored in, for example, a part of the FM chips 420 and may be read from the part of the FM chips 420 and stored in the RAM 413. Note that the RAM 413 may include a part or all of roles of the data buffer 416. The RAID configuration information 810 received from the storage controller 100 is stored In the RAM 413.

The I/O interface 411 is a device that is coupled to the storage controller 100 via the bus 180 and communicates with the components in the storage controller 100.

The processor 415 controls the entire device controller 410 on the basis of the FM management information stored in the RAM 413. The processor 415 executes read on the other storage devices in the same RAID group and performs a rebuild process. A specific example of the process is explained below.

The data buffer 416 temporarily stores data halfway in a data transfer process in the device controller 410.

The FM interface 417 is coupled to the FM chips 420 by a plurality of (e.g., eight) buses. A plurality of (e.g., four) FM chips 420 are coupled to each of the buses.

The rebuild process unit 418 is a hardware circuit that performs the XOR operation. In this embodiment, the rebuild process unit 418 is explained as the hardware circuit. However, the device controller 410 only has to include a function of the rebuild process. The rebuild process may be performed by hardware or may be performed by the processor 415 by executing a program.

The switch 414, the I/O interface 411, the processor 415, the data buffer 416, the FM interface 417, and the rebuild process unit 418 may be configured in one semiconductor element as an ASIC or an FPGA (Filed Programmable Gate Array) or may be configured by coupling a plurality of individual dedicated ICs (Integrated Circuits) to one another.

Subsequently, a logical storage space provided to the storage controller 100 by the storage device 310 in this embodiment is explained. The logical storage space is configured by a plurality of logical areas. Logical addresses are associated with the logical areas. The storage controllers 100 (the CPU 120) can read/write, by issuing an access command designating a logical address to the storage device 310, data in a logical area corresponding to the designated logical address. A physical address used only inside the storage device 310 is associated with each of a plurality of physical areas configuring the physical storage space configured by the plurality of FM chips 420. In this embodiment, a physical address representing the position of the physical area of the storage device 310 is referred to as "PBA" (PBA is an abbreviation of Physical Block Address) and a logical address representing the position of the logical area of the storage device 310 is referred to as "device LBA" (LBA is an abbreviation of Logical Block Address). The PBA represents a position of a 16 KB unit, which is a page size of the FM. In this embodiment, an example is explained in which the page size of the FM and the management unit of the PBA are the same. However, the page size and the management unit may be different. The storage device 310 manages association of the PBA and the device LBA in, for example, an address conversion table explained below.

FIG. 9 shows a configuration example of an address conversion table 710.

The address conversion table 710 is stored in the RAH 413 in the storage device 310. The address conversion table 710 includes records for each of logical areas of the logical storage space provided by the storage device 310. The records include a device LBA 711 and a PBA 712.

The device LBA 711 represents a leading address of a logical area obtained by dividing the logical storage space provided by the storage device 310 into logical areas of a predetermined size. In this embodiment, an example is explained, in which the logical area size is set to 16 KB. Consequently, since the logical area size is set the same as the page unit (in this embodiment, 16 KB), which is a unit of accessibility to the FM 210, it is possible to associate the logical area sire and the page unit in a one-to-one relation. Therefore, it is easy to perform access control to the FM 210.

Note that the logical area size may be optionally determined as long as the logical area size is a size smaller than a size of the logical storage space provided by the storage device 310.

The PBA 712 is a PBA representing a position of a physical area. As explained above, in this embodiment, the physical storage space of the storage device 310 is divided for each 16 KB and managed. In the example shown in FIG. 9, a PBA "0x0000_0010" is associated with a device LBA "0x0000_0000". Consequently, when a device LBA designated by a read command is "0x0000_0000", the device controller 410 reads data from a page represented by the PBA "0x0000_0010".

Note that, when a PBA is not associated with a device LBA, "unallocated" is stored as a record of the PEA 712 corresponding to the device LBA.

The "unallocated" indicates a state in which data is not stored with respect to the LBA. This is a state in which a PBA is not allocated to the LBA. When the storage device is formatted by, for example, writing zero data in the FM, the state may be managed as the "unallocated".

For example, when the zero data is written in the FM and the storage device is formatted, a PBA in which the zero data is stored is allocated to the LBA, the state may be managed as an allocated state.

Figure 10:
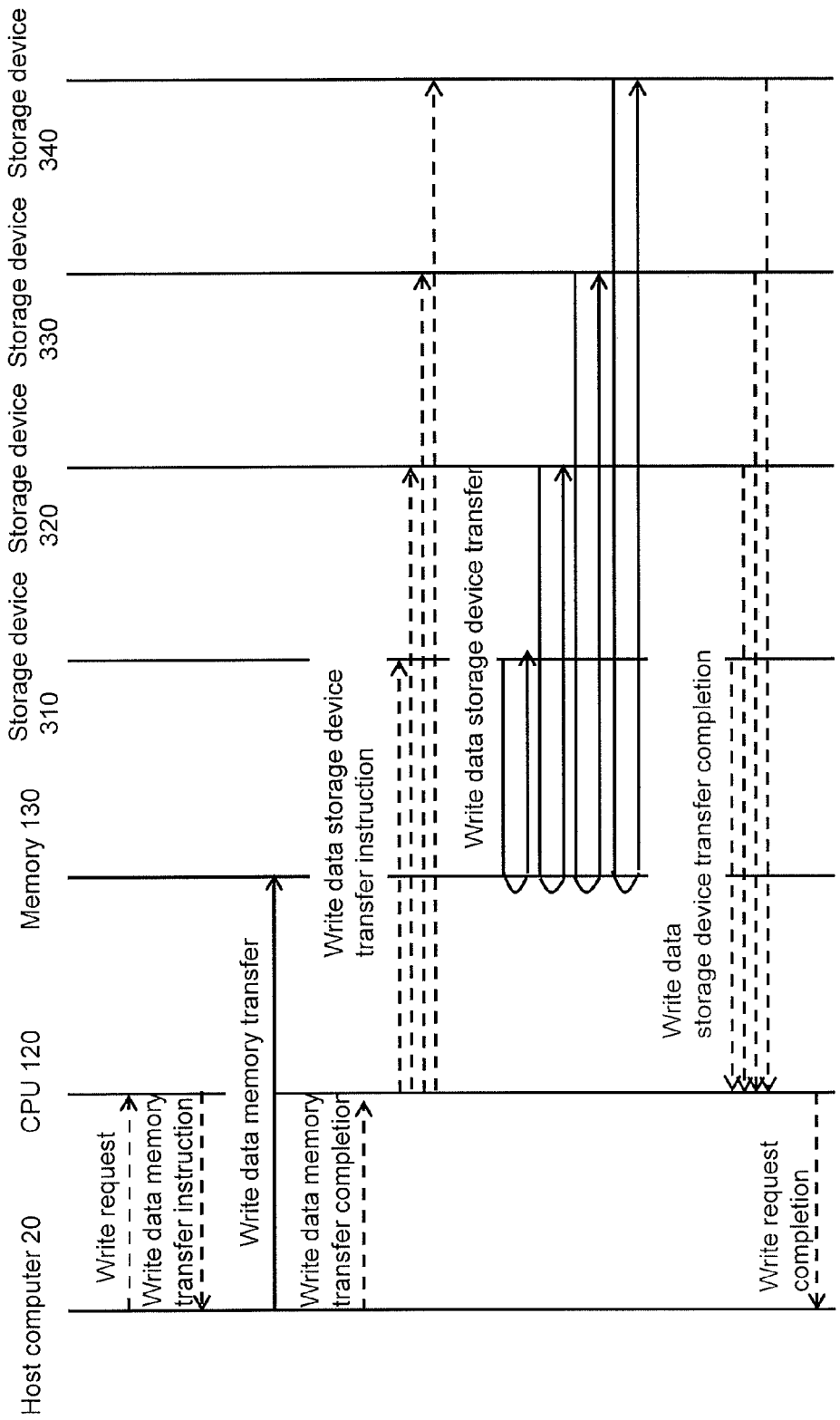
FIG. 10 shows an operation flow of a write request.

An operation flow in the case in which the storage unit 10 receives a write request from the host 20 is explained with reference to FIG. 10. A dotted line arrow indicates exchange of control information. A solid line arrow indicates exchange of data.

First, the host 20 issues a write request to the storage unit 10. The write request includes an ID of a logical volume at a write destination and information concerning a host LBA "0x000_0000" and a write data sire "48 KB". The CPU 120 of the storage unit 10, which receives the write request, reserves a memory area for a size of write data on the memory 130. The CPU 120 instructs the host computer 120 to transfer write data including address information of the reserved memory area to the memory. The host computer 20, which receives the write data memory transfer instruction, transfers the write data to the instructed memory area. When the data transfer is completed, the host computer 20 notifies the CPU 120 of the completion of the write data memory transfer. The CPU 120, which receives the write data memory transfer completion notification, reads the write data from the memory, creates parity data, and calculates a device number and an intra-device address of the write destination. The CPU 120 determines a plurality of target storage devices 310 to 340 on the basis of the device number and intra-device address information and issues a write data storage device transfer instruction. In this embodiment, the CPU 120 issues instructions for transferring the Data 0, the Data 1, the Data 2, and the Parity 0 shown in FIG. 3 respectively to the recording device 310, the storage device 320, the storage device 330, and the storage device 340. The write data storage device transfer instruction includes addresses of the memory 130 in which the Data 0, the Data 1, the Data 2, and the Parity 0 are respectively stored, and an intra-device address in which the write data or the parity data is stored.

The device controllers 410 of the storage devices 310 to 340, which receive the write data storage device transfer instruction, read the write data or the parity data from the memory 130 on the basis of the designated address of the memory 130 and save the write data or the parity data in an area of the designated intra-device address. The storage device, in which the saving is completed, notifies the CPU 120 of the write data storage device transfer completion. The CPU 120, which receives issued all write data storage device transfer completion notifications, notifies the host of the write request completion.

Figure 11:
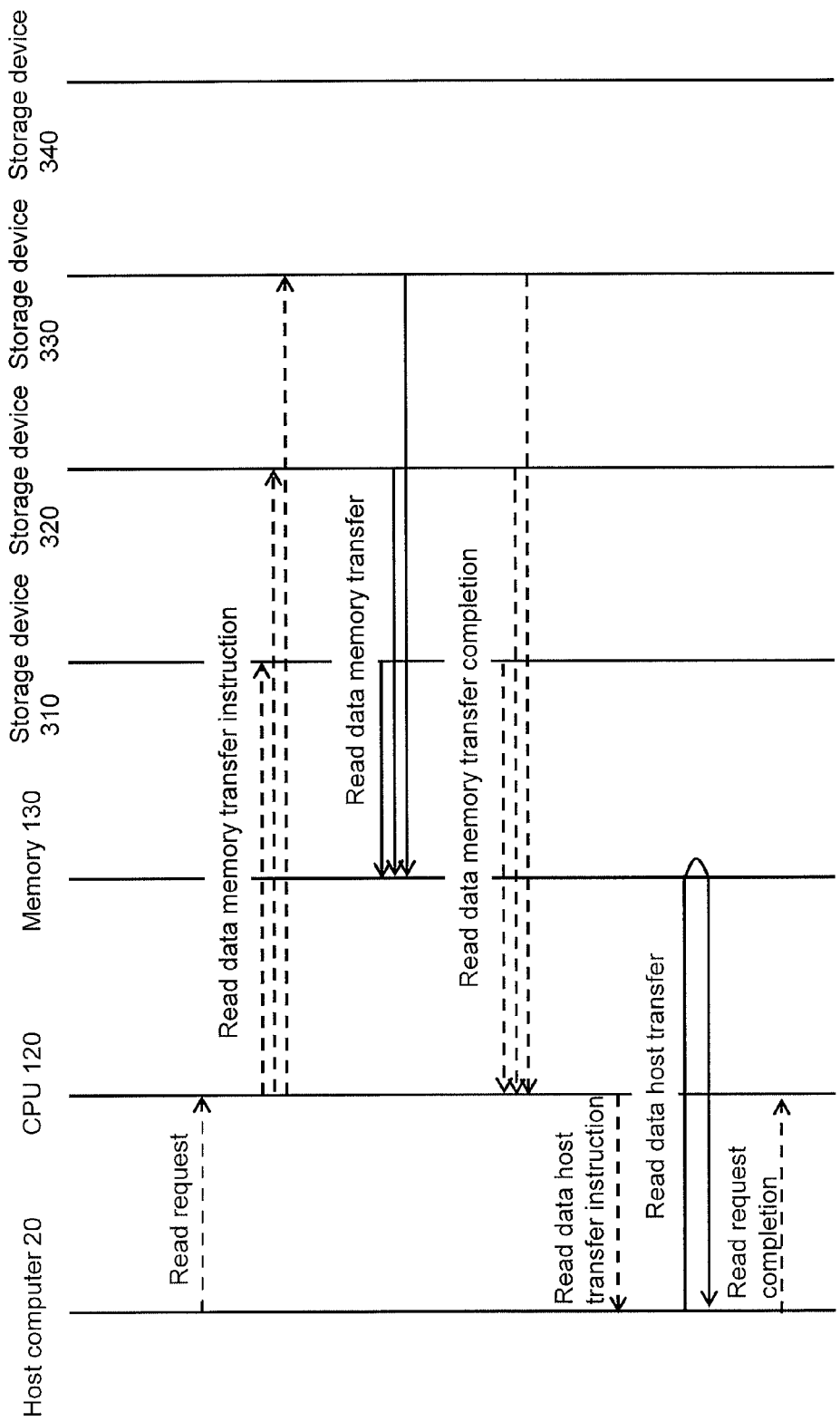
FIG. 11 shows an operation flow of a read request.

An operation flow in the case in which the storage unit 10 receives a read request from the host 20 is explained with reference to FIG. 11. As the read request, an example is explained in which a host LBA "0x0000_0000" and a data size "48 KB" are read.

First, the host 20 issues a read request to the storage unit 10. The CPU 120, which receives the read request, instructs, using a result obtained by calculating a device number and an intra-device address, a target storage device to transfer read data to the memory. The read data memory transfer instruction includes an address of the memory 130 that stores the read data.

In this embodiment, data of "0x0000_0000" of a device #0, "0x0000_0000" of a device #1, and "0x0000_0000" of a device #2 are read by calculation.

The storage devices 310, 320, and 330, which receive the read data memory transfer instruction, respectively carry out write of the instructed data in the instructed address of the memory 130. When the write ends, the storage devices 310, 320, and 330 notify the CPU 120 of the read data memory transfer completion. When receiving all of read data memory transfer completion notifications, the CPU 120 instructs the host 20 to transfer read data including area, information of the memory to the host. The read data host transfer instruction includes an area (an address) of the memory 130 in which the read data is stored. The host 20, which receives the read data host transfer instruction, reads the read data from the target memory area, transfers the read data to a memory of the host. When the transfer of the read data is completed, the host 20 notifies the CPU 120 of the read request completion. The CPU 120, which receives the notification, releases the target memory area and performs a completion process for the read request.

First Embodiment

Figure 12:
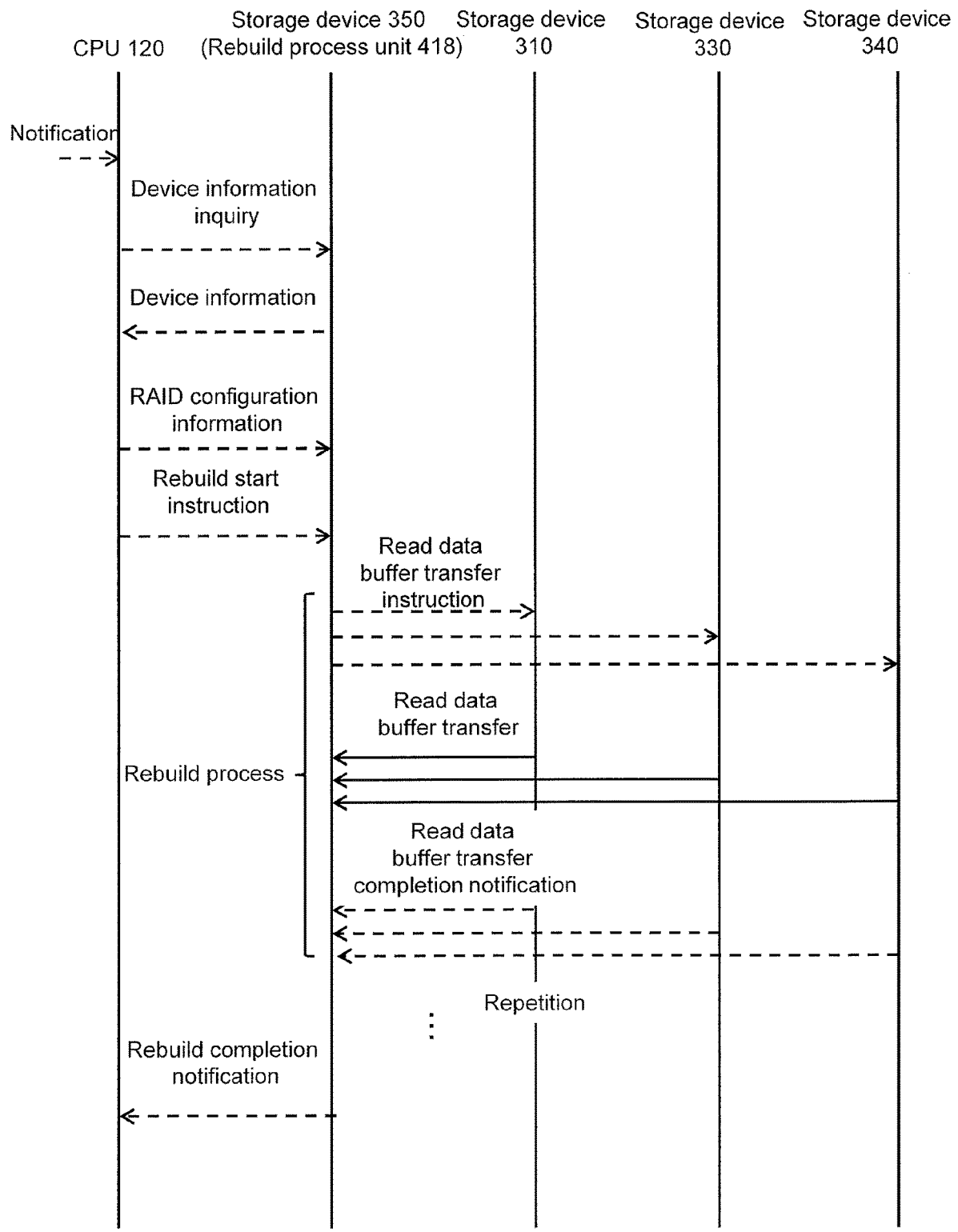
FIG. 12 shows an operation flow of a rebuild process in a storage unit.

As a first embodiment of the present invention, an operation flow of a rebuild process at the time when a new storage device 350 is coupled to the storage unit 100 from a state in which the storage device 320 in FIG. 1 breaks down and is detached from an enclosure and is not recognized is explained with reference to FIGS. 12 and 13.

When the storage device 350 is coupled to the PCIe bus 180, the coupling is notified to the CPU 120 of the storage controller 100. Consequently, the CPU 120 recognizes that the broken-down storage device 320 is replaced with the new storage device 350. The CPU 120 inquires about device information (e.g., a logical storage space size and a communication space size) of the storage device 350 and presence or absence of a device rebuild function. The CPU 120 confirms that the device information has a function same as the function of the broken-down storage device 310. When the device information does not have the function same as the function of the storage device 320, the storage controller 100 informs, with a screen of a management computer or an alarm, a maintenance person that the function of the replaced storage device is different. Consequently, it is possible to prevent the storage system 10 from operating in an error state. Thereafter, the CPU 120 registers the device information in the address map of the CPIe bus shown in FIG. 9. In this embodiment, a device number same as a device number of the broken-down storage device 320 is "1" and an address offset is "0x1000_0000".

Subsequently, the CPU 120 notifies the storage device 350 of the RAID configuration information 810 and issues a rebuild process start instruction to the storage device 350. In this embodiment, the information shown in FIG. 5 is the RAID configuration information. However, the RAID configuration, information may be any information as long as a RAID configuration is seen. For example, if the storage device determines the number of data in a RAID stripe as an initial table, the information concerning the RAID configuration 813 does not have to be sent.

The processor 415 of the storage device 350, which acquires the RAID configuration information, designates, as a transfer destination, a device LEA in a communication space corresponding to the data buffer 416 of the storage device 350 and issues a read data buffer transfer instruction including information concerning the read target device DBA to the storage devices 310, 330, and 340. Consequently, the processors 415 of the storage devices 310, 330, and 340 can transfer data, to the data, buffer 416 mapped as a communication space on the storage device 350. Data is not stored in a place where a PBA is unallocated in a device LBA instructed in the read data buffer transfer instruction. Therefore, when read data buffer transfer completion is notified, the processors 415 notify that data is unallocated without returning data. Consequently, it is possible to restore an unallocated state of the address conversion table 710 of the storage device 350. The processors 415 perform a data restoration process every time all of read data transfer completion notifications of the RAID stripe are returned and store restored data in the FM.

The processors 415 repeatedly execute the rebuild process in all intra-device addresses. When the rebuild process in all the intra-device addresses is completed, the processors 415 notify the CPU 120 of the rebuild completion. Consequently, the rebuild process is completed.

Figure 13:
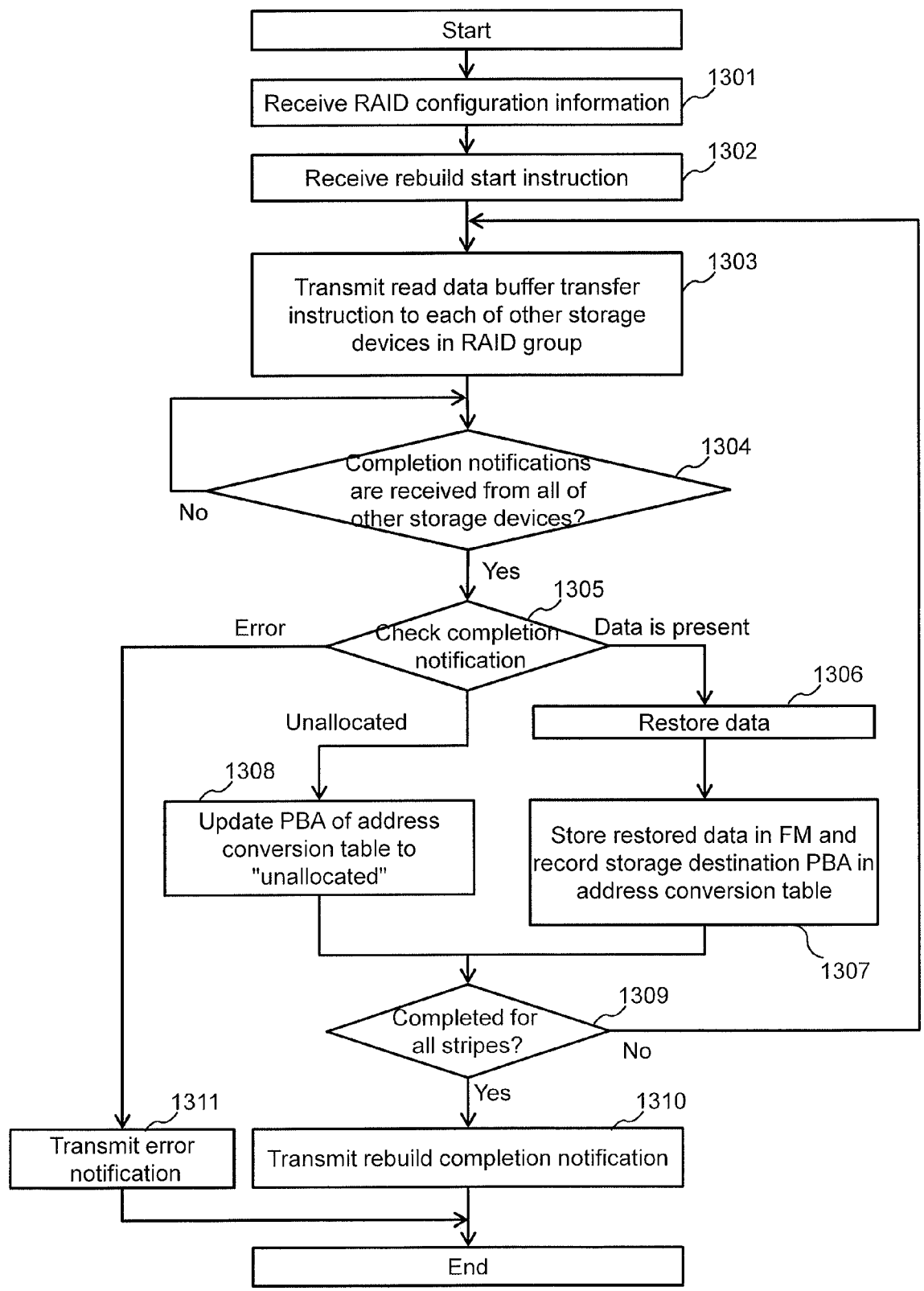
FIG. 13 shows an operation flow of a rebuild process in the storage device.

FIG. 13 is an operation flow in the rebuild process of the storage device 350.

After the storage device 350 is coupled to the storage unit 100, the storage device 350 receives the RAID configuration information 810 from the storage controller 100 (step 1301). The processor 415 stores the received RAID configuration information 810 in the RAM 413.

Subsequently, the processor 415 receives a rebuild start instruction (step 1302) and starts the rebuild process. The rebuild start instruction may include an instruction for a range of rebuild (a range of an infra-device address). However, it is assumed that the entire range of the storage device 350 is rebuilt in FIG. 13.

The processor 415 refers to the RAID level 812 and the RAID configuration 813 of the RAID configuration information 810 and specifies a device number from which data/parities necessary for data restoration should be read. In this embodiment, since the RAID 5 is 3D1P, the processor 415 determines that it is necessary to read data/parities from each of the device #0 (the storage device 310), the device #2 (the storage device 330), and #3 (the storage device 340). Subsequently, the processor 415 selects the device LBA in order from the top of the device LBA and specifies the devices LBA (the read target devices LBA) in the storage devices 310, 330, and 340 of the RAID stripe corresponding to the selected device LBA. For example, if the device LBA of the storage device 350 is "0x1000_0000", the processor 415 specifies "0x0000 0000" of the storage device 310, "0x2000_0000" of the storage device 330, and "0x3000_0000" of the storage device 340 as the devices LBA of the other storage devices. All sizes of data are "16 KB" according to the stripe size 814. Concerning the devices LBA corresponding to second and subsequent RAID stripes, sizes of data can be calculated if the sizes are shifted by the stripe size (16 KB) for each of the RAID stripes. The specified device LBAs are read target devices LBA from which data and/or parities are read.

Subsequently, the processor 415 of the storage device 350 respectively determines areas of the data buffer 416, which is a storage destination of the read data and/or parities, and specifies the devices LBA in the communication space of the storage device 350 corresponding to the areas. The processor 415 of the storage device 350 creates a read data buffer transfer instruction to each of the other storage devices in the RAID group. A read target device LBA is designated as a transmission destination of the read data buffer transfer instruction. A device LBA in the communication space is designated as a storage destination of the read target data. The processor 415 transmits the read data buffer transfer instruction to the storage devices (step 1303).

The processor 415 of each of the storage devices 310, 330, and 340, which receive the read data buffer transfer instruction, specifies a PBA corresponding to the designated device LBA referring to the address conversion table 710, reads data/parities from the FM, transmit the data/parities to the device LBA in the communication space of the designated storage device 350, and transmits a read data buffer transmission completion notification. When data/parities corresponding to the designated device LBA are not stored in the FM, that is, when the address conversion table 710 is in the state of "unallocated", each of the storage devices 310, 330, and 340 transmits the read data buffer transfer completion notification including information concerning "unallocated" to the storage device 350 without transmitting data/parities. When the data/parities corresponding to the designated device LBA cannot be read because of an uncorrectable error, the device controller 410 of each of the storage devices 310, 330, and 340 transmits the read data buffer transfer completion notification including information concerning "error" to the storage device 350.

The processor 415 manages whether completion notifications for read data buffer transfer instructions are received and periodically determines whether read data buffer transfer completion notifications are received from all the other storage devices (step 1304).

If receiving the read data buffer transfer, completion notifications from all the other storage devices (Yes in step 1304), the processor 415 proceeds to step 1305. If not receiving the read data buffer transfer completion notifications (No in step 1304), the processor 415 performs the determination in step 1304 again after a predetermined time.

The processor 415 checks the received read data buffer transfer completion notifications (step 1305).

When data is stored in the data buffer 416, the processor 415 reads data and parities from the data buffer 416, causes the rebuild process unit 418 to execute the XOR operation, and restores data (step 1306). Subsequently, the processor 415 stores the restored data in the FM and records the storage destination PBA in association with the device LBA of the address conversion table 710 (step 1307).

When the read data buffer transfer completion notification is "unallocated", the processor 415 records "unallocated" in a PBA field corresponding to the device LBA in the address conversion table 710.

When the process in step 1307 or step 1308 is completed, the processor 415 updates information indicating to which extent the rebuild, process is completed (rebuild process completed address information) and checks whether the process is completed concerning all stripes. If the process is not completed (No in step S1309), the processor 415 returns to step 1303. If the process is completed (Yes in step 1309), the processor 415 transmits a rebuild completion notification to a transmission source of the rebuild start instruction (step 1310) and ends the process.

When the read data buffer transfer completion notification is "error" in step 1305, the processor 415 transmits an error notification indicating that the rebuild is impossible to the transmission source of the rebuild start instruction and ends the process. This is because, as in this, embodiment, in the RAID 5, when the read data buffer transfer completion notification is an error, two or more uncorrectable errors occur in the RAID stripe and data cannot be restored.

In this embodiment, the transmission source of the RAID configuration information and the rebuild start instruction is the storage controller 100. However, when the processor 415 is directly coupled to a host apparatus such as the host computer 20, the processor 415 receives information and an instruction from the host apparatus and sends a completion notification to the host apparatus.

As explained above, by performing the rebuild process as in the first embodiment, since data used in the rebuild process is not input to the storage controller 100, a load is not imposed on the storage controller 100. Therefore, it is possible to prevent performance deterioration of the storage controller 100 due to the rebuild process. The performance of a storage unit being rebuilt is improved.

Access to a storage device that is executing the rebuild process is explained.

Usually, the storage controller 100 does not access a storage device that is executing the rebuild process. For example, in the case of a read process, until the CPU 120 of the storage controller 100 receives a rebuild process completion notification after transmitting a rebuild start instruction to the storage device 350, the CPU 120 reads data and parities of a RAID stripe same as a read target device LBA from the storage device 310, the storage device 330, and the storage device 340 and transfers the data and the parities to the memory 130, performs a data restoration process in the storage controller 100, and transfers restored data to the host 20.

However, in this case, there is a problem in that a response to the host 20 is delayed because of read of data and parities from the plurality of storage devices and the data restoration process. Therefore, in this embodiment, concerning an area where data restoration is completed, the CPU 120 accesses the storage device 350 that is executing the rebuild process.

When a storage device executes the rebuild process, the storage controller 100 cannot grasp a progress state of the rebuild process. Therefore, in this embodiment, the processor 415 of the storage device 350 performs the rebuild process in order from, for example, a leading address. However, the processor 415 notifies the storage controller 100 of rebuild process completed address information. If there is a read request from a host to a host LBA of the host, the CPU 120 can issue a read data memory transfer instruction to the storage device 350 before receiving a rebuild process completion notification.

Figure 14:
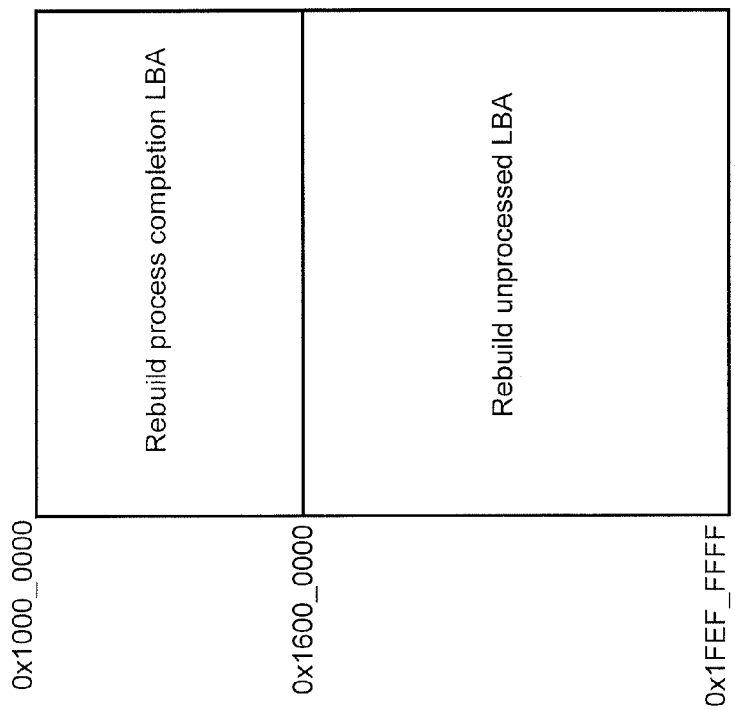
FIG. 14 shows a state of an LBA during rebuild.

FIG. 14 is an example illustrating a state of LBAs being subjected to the rebuild process. In this embodiment, since the device #1 is set as a target of the rebuild process, rebuild target LBAs are 0x1000_0000 to 0x1FEF_FFFF. FIG. 14 indicates that the data restoration process is completed for 0x1000_0000 to 0x1600_0000 and indicates that the data restoration process is not performed in a range of 0x1600_0000 to 0x1FEF_FFFF. When data restoration of one RAID stripe is completed, the processor 415 of the storage device 350 stores, in the RAM 413, an address for which the data restoration process is completed. The storage device 350 notifies the CPU 120 of a rebuild process completed address 0x1600_0000. The CPU 120 stores the received rebuild process completed address of the storage device 350 in the memory 130.

The processor 415 may notify the rebuild process completed address every time the data restoration is completed for one RAID stripe or may notify the rebuild completed address when the data restoration is completed for two or more PAID stripes. The storage controller 120 may request the storage device 350 to transmit the rebuild process completed address. The processor 415 of the storage device 350 may transmit the rebuild process completed address to the storage controller 100 in response to the request.

A process flow of the storage controller concerning a case in which a read request is received from the host at the time of the rebuild process state shown in FIG. 14 is explained with reference to FIG. 15.

First, when receiving a read request from the host 20, the GPU 120 calculates a target storage device number, in which data serving as a target of the read request from the host 20 is stored, and a target LBA (S1500). Subsequently, the CPU 120 determines whether the target device is being rebuilt (S1501). When it is managed in the RAID configuration information 810 whether the target storage device is being rebuilt, the CPU 120 determines whether the target storage device is being rebuilt referring to the RAID configuration information 810 of the memory 130.

If the target storage device is not being rebuilt, the CPU 120 issues a read data memory transfer instruction to the target storage device as usual (S1504). If the target storage device is being rebuilt, the CPU 120 determines whether the rebuild is completed for the target LBA referring to a rebuild process completed address of the target storage device stored in the memory 130 (S1502). When the rebuild is completed for the target LBA, the CPU 120 issues a read data memory transfer instruction to the target device and acquires data serving as a target of a read request (S1504). If the rebuild is not completed for the target LBA, the CPU 120 specifies a storage device number and an LBA corresponding to the target LBA in the same RAID stripe and issues a read data memory transfer instruction to the storage devices. The CPU 120 transfers read data received from the storage devices to the memory 130 and performs restoration of the data serving as the target of the read request (S1503). The CPU 120 transfers the target data of the read request to the host 20 (S1505).

Consequently, even if the storage device 350 is being rebuilt, the storage controller 100 can read the read data from the storage device 350 in an area where data is already restored. Therefore, there is an advantage chat a response of the read data transfer to the host is early.

A process flow of the storage controller 100 concerning a case in which a write request is received from the host 20 in the rebuild process state shown in FIG. 14 is explained with reference to FIG. 16. Note that a process flow for write data changes between when data to be written is data and when the data to be written is parity.

Specifically, when receiving a write request from the host 20, the CPU 120 calculates a target storage device number and a target LBA from the write request received from the host 20 (S1610). Thereafter, the CPU 120 determines whether a write target storage device of write request data is being rebuilt (S1611). If a determination result in S1611 is Yes, the CPU 120 determines whether rebuild is completed for the target LBA referring to a rebuild process completed address of the target storage device stored in the memory 130 (S1612).

If a determination result in S1612 is No, the CPU 120 generates parity data after update of the same RAID stripe, issues a write data storage device transfer instruction to a storage device in which parity data before the update is stored, and writes the parity data after the update (S1613). If the parity data is updated, the data after the update is restored in the following data restoration process. Therefore, it is unnecessary to write the write request data in the target storage device.

If the determination result in S1612 is Yes, the CPU 120 generates parity data after update of the same RAID stripe in the same manner as the normal write process and writes the parity data after the update according to a write data storage device transfer instruction. Further, the CPU 120 issues a write data storage device transfer instruction to the target storage device (S1614).

A case in which the determination result in S1611 is No is explained. When the determination result in S1611 is NO, the CPU 120 determines whether a write target storage device of parity data is being rebuilt (S1615). If a determination result in S1615 is No, the CPU 120 performs the normal write process as in S1614 (S1618). If the determination result in S1615 is Yes, the CPU 120 determines whether data restoration of the target LBA is completed (S1616). If the determination result in S1616 is Yes, the CPU 120 performs the process in S1614 explained above. If the determination result in S1616 is No, the CPU 120 issues a write data storage device transfer instruction to the target device (S1617). When the storage device that stores the parity data is being rebuilt and the rebuild is not completed for the target LBA, if the write data is updated, parity after update is restored in the following data restoration process. Therefore, it is unnecessary to write the parity data in the target storage device.

As explained above, when the write request is received from the host 20 during the rebuild, it is unnecessary to write the write data or the parity data (the write data or the parity data is rebuilt and written when the rebuild process is performed later) when the rebuild process is not completed. Therefore, it is unnecessary to issue the write data storage device transfer instruction to an LBA for which the rebuild process is not completed. Consequently, it is possible to reduce issuance of commands to the storage device being rebuilt. Therefore, it is possible to suppress an increase in a rebuild process time due to an Increase in a load on the storage device being rebuilt.

Figure 15:
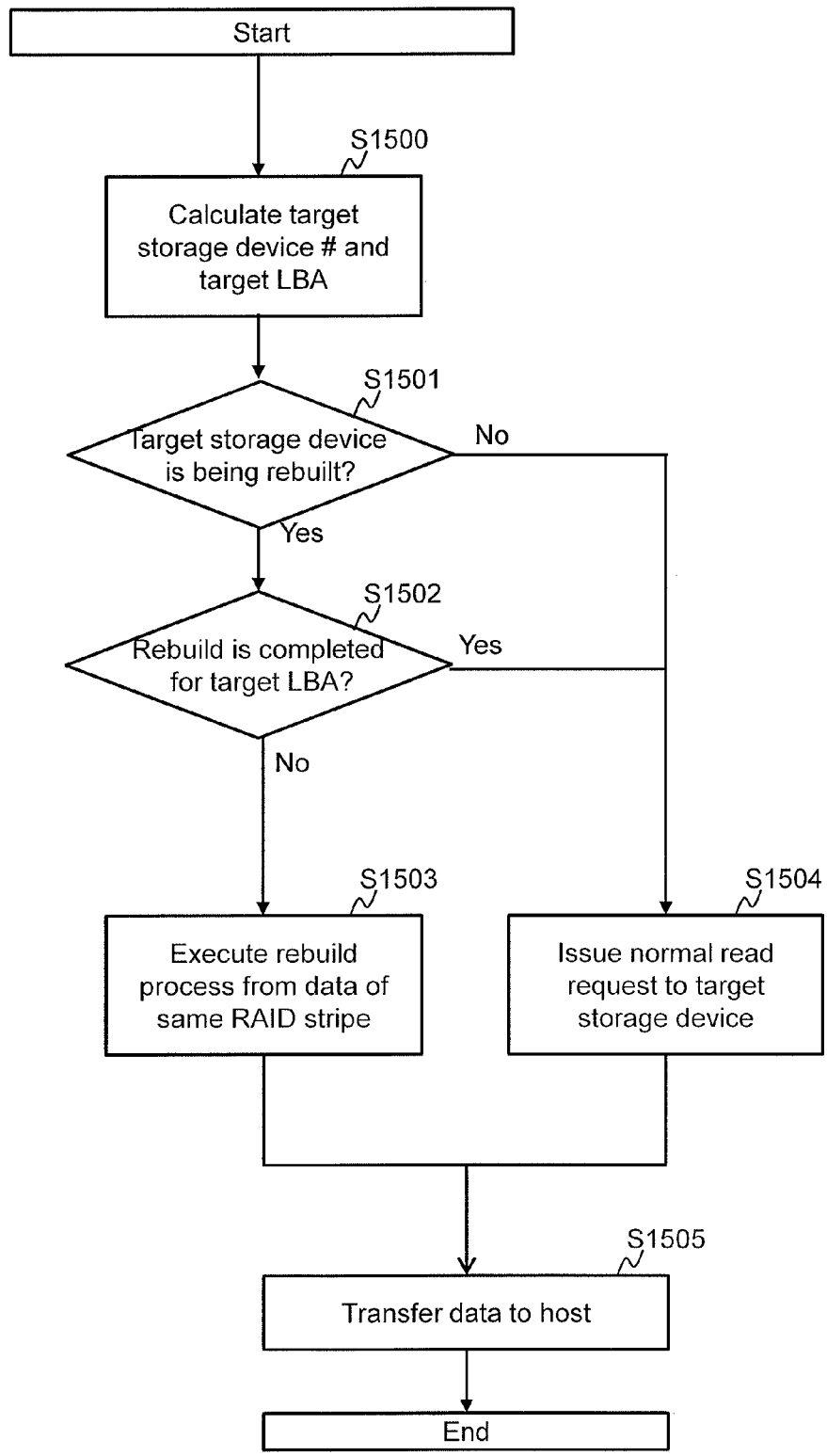
FIG. 15 shows an operation flow of a read request during the rebuild.
Figure 16:
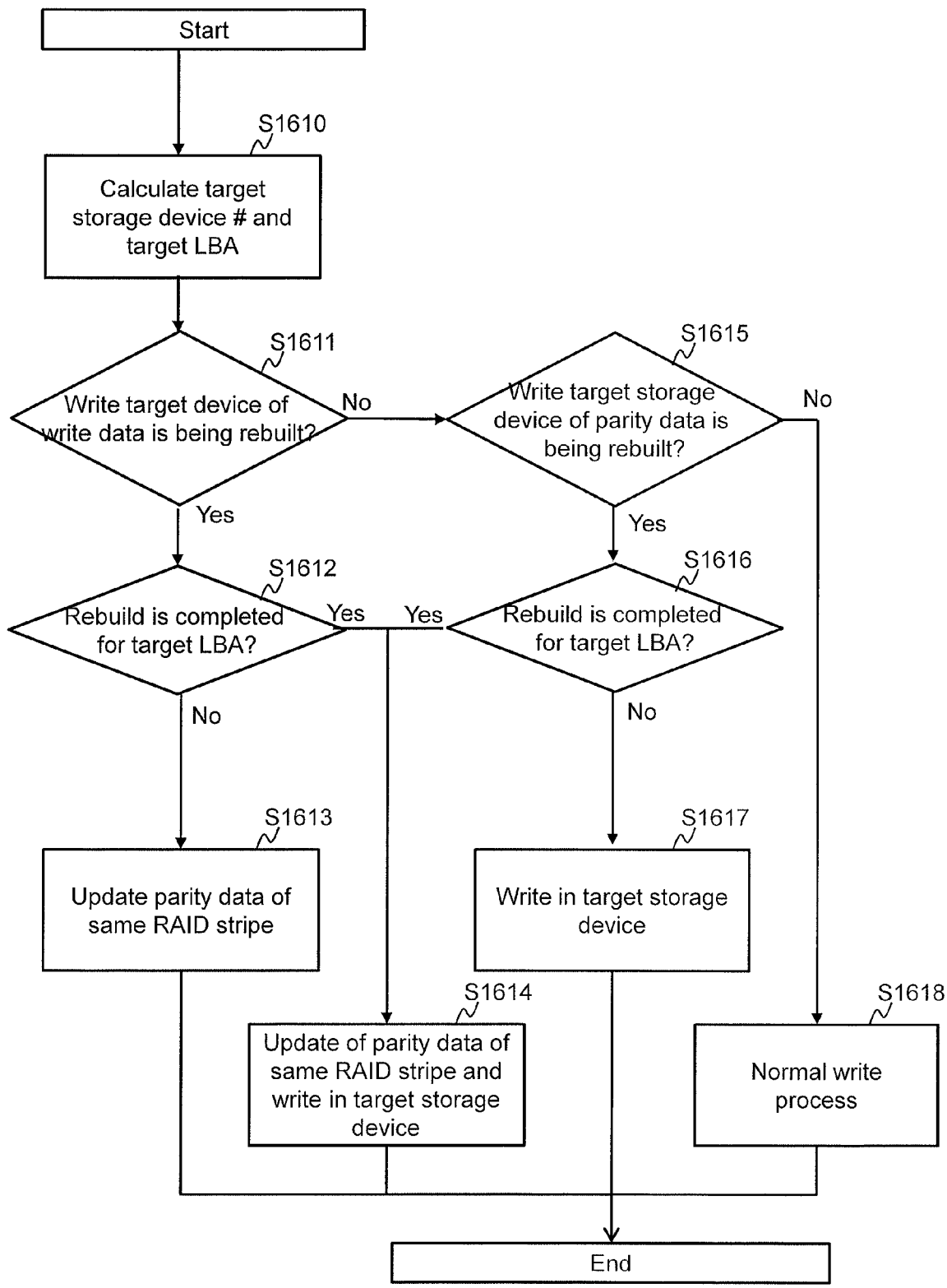
FIG. 16 shows an operation flow of a write request during the rebuild

In this embodiment, the example is explained in which, during the rebuild process of the storage device, the storage controller 100 changes the operation during the read request/write request (FIG. 15 and FIG. 16). However, in FIG. 12, the storage device may return the rebuild completion notification to the storage controller 100 immediately after the rebuild start instruction (e.g., before a start of the data restoration process for a first RAID stripe). The device controller may perform the processes shown in FIGS. 15 and 16. In this case, the rebuild process completed address is managed in the device controller 410. Therefore, as in FIGS. 15 and 16, the device controller 410 is capable of dividing operation in a place where the rebuild process is completed and a place where the rebuild process is not completed. Consequently, even during the rebuild of the storage device, the storage controller can access the storage device assuming that the rebuild is completed. It is possible to reduce a load on the storage controller.

In this embodiment, the example is explained in which the rebuild process of the entire range of the intra-device addresses is performed. However, the storage device may receive information indicating a place Where data is effective (data effective information) from the storage controller 100 and perform the rebuild process of only an effective intra-device address. Consequently, since it is unnecessary to issue a needless read command to the other storage devices, it is possible to perform the rebuild process at higher speed. As a specific example of the data effective information, for example, information In which flags of "1" and "0" are collected for each management unit of the intra-device addresses shown in FIG. 9 (bitmap information) may be sent or information in which a plurality of sets of heading addresses and sizes of effective data (effective range information) may be notified.

Figure 17:
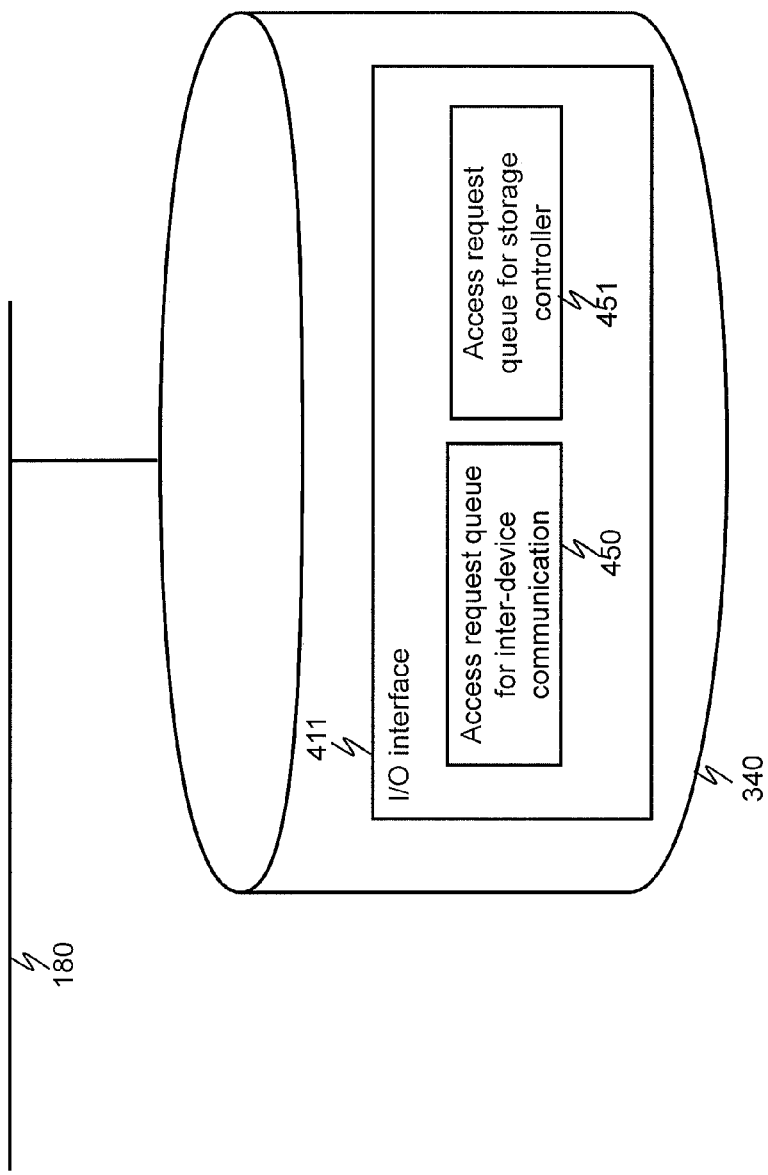
FIG. 17 shows access request queues of an I/O interface.

An example of access request queues of the I/O interface in the storage device 340 is shown in FIG. 17. As shown in FIG. 17, an access request queue for inter-device communication 450 and an access request queue for storage controller 451 are separated. Consequently, it is possible to process an access request from the storage controller 100 at higher priority. It is possible to realize a write request or a read request from the host without reducing process speed of the write request or the read request even when the other storage devices are executing the rebuild process and issue many read requests.

Second Embodiment

As a second embodiment of the present invention, the operation of a rebuild process at the time when read data from an FM cannot be normally read because of an uncorrectable error in a storage device is explained.

Conventionally, if an uncorrectable error occurs in the read data from the FM in the storage device, the storage device notifies the storage controller 100 that the uncorrectable error occurs. The storage controller 100 reads data/parities from the other storage devices in the RAID group and restores the data in which the uncorrectable error occurs. In this embodiment, the storage device restores the data through communication among the storage devices without notifying the storage controller 100 that the uncorrectable error occurs. Consequently, a load on the storage controller is reduced and the number of times of communication between the storage controller and the storage device is reduced.

Figure 18:
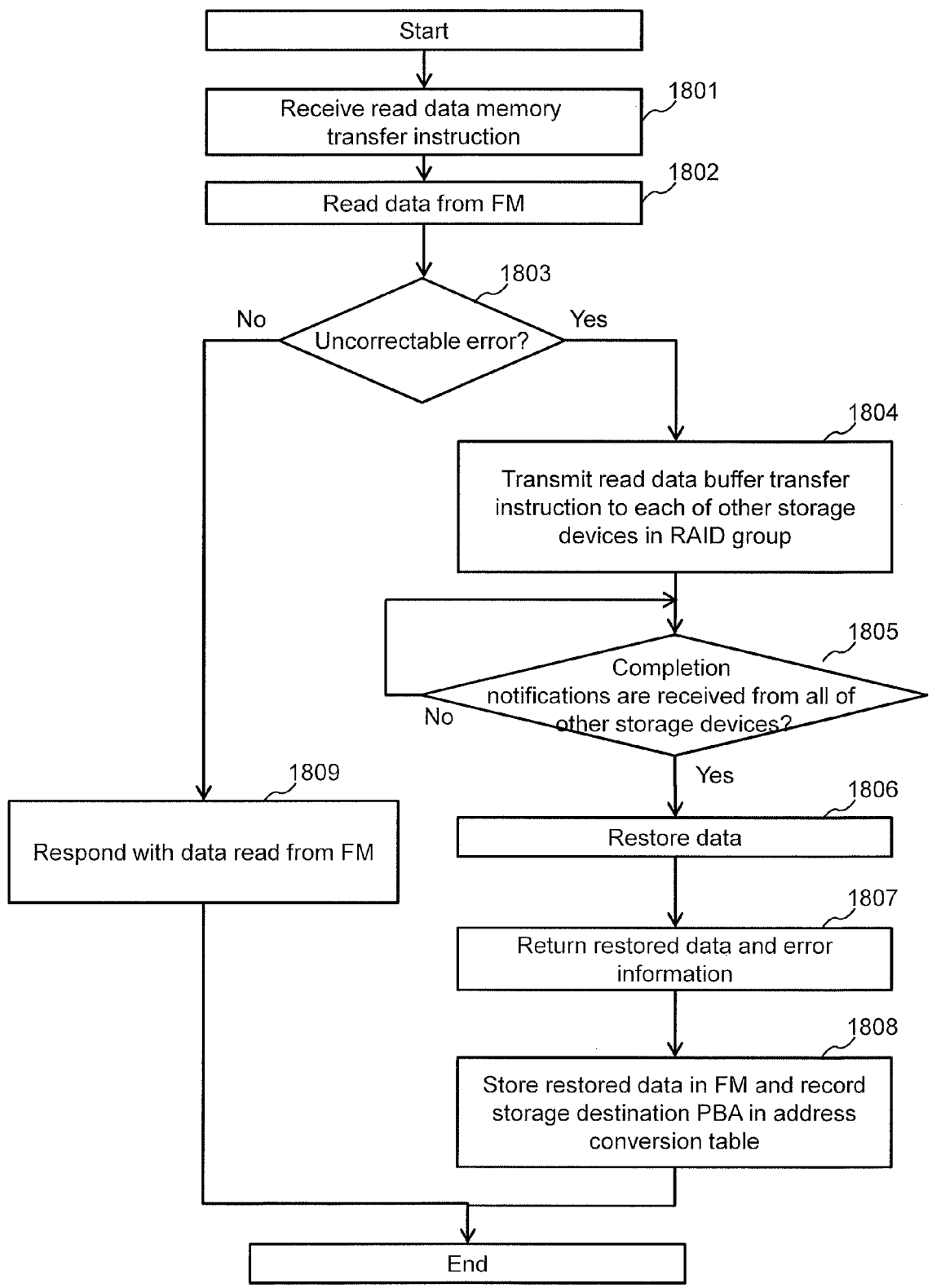
FIG. 18 shows an operation flow of the rebuild process in the storage device.

FIG. 18 shows an operation flow of a rebuild process in the case in which an uncorrectable error occurs in the storage device.

The device controller 410 receives a read data memory transfer instruction (step S1801). In this embodiment, a transmission source of a read request is the storage controller 100. However, when the device controller 410 is directly coupled to a host apparatus such as the host computer 20, the device controller 410 receives the read data memory transfer request from the host apparatus. For example, the following process is explained assuming that the storage device 320 receives a read data memory transfer instruction (a device LBA "0x1000_0003" and a transfer size "16 KB").

The device controller 410 specifies a PBA corresponding to an instructed device LBA and reads data from the FM (step 1802). Subsequently, the device controller 410 performs an error check of the read data and determines whether an uncorrectable error occurs (step 1803). Specifically, the FM interface 417 of the device controller 410 has an error check function and determines, with the error check function, whether read data can be normally read. If a determination result in S1803 is Yes, the FM interface 417 notifies the processor 415 of a read error. The processor 415, which receives the read error notification, specifies a RAID stripe of target data on the basis of the RAID configuration information shown in FIG. 5 configured from the storage controller 100 during initialization. In this example, data of a RAID stripe with the intra-device address "0x000_0003" shown in FIG. 3 is a target. Therefore, the processor 415 transmits a read data buffer transfer instruction to device LEAs "0x000_0003", "0x2000_0003", and "0x30000_0003", sizes of all of which are "16 KB" (step 1804). When all read data buffer transfer completion notifications are returned, the processor 415 performs a rebuild process (a process for calculating XOR of bits of three read data) to restore the data (step 1806). The processor 415 returns the restored data to the storage controller 100 (step 1807).

Consequently, it is possible to avoid an uncorrectable error without imposing a load on the storage controller 100 at all (without the storage controller 100 noticing).

Further, assuming data subjected to the rebuild process once is requested to be written in the device LBA "0x1000_0003", the processor 415 updates the write address conversion table 710 in the FM (step 1808). Consequently, when a read request is set to the same device LBA next time, a restoration process of data does not have to be performed. Step 1807 and step 1808 may be executed in parallel or the order of the steps may be opposite.

If the determination result in S1803 is No, the processor 415 responds to the storage controller 100 with data read from the FM (S1809).

As explained above, when an uncorrectable error occurs in the target data of the read data memory transfer instruction, the storage device does not need to notify the storage controller of the occurrence of the uncorrectable error. Therefore, even when the uncorrectable error occurs, a load on the storage controller is reduced and the number of times of communication between the storage controller and the storage device is reduced.

When the uncorrectable error is subjected to the rebuild process and the data is returned, completion including indication that the read data is obtained by subjecting the uncorrectable error to the rebuild process may be notified. In that case, the storage controller 100 can recognize that the uncorrectable error occurs. A storage device in which the uncorrectable error occurs many times is highly likely to break down in itself. Therefore, for example, the storage controller 100 manages the number of times of occurrence of the uncorrectable error for each of the storage devices. Concerning the storage device in which the uncorrectable error occurs predetermined times or more, the storage controller 100 notifies a warning to a management computer managed by a storage manager and displays a message for recommending replacement of the storage device on a screen of the management computer. Consequently, the storage manager can learn possibility of a failure of the storage device early and can replace the storage device before the storage device breaks down. Therefore, it is easy to perform planned maintenance.

Third Embodiment

As a third embodiment of the present invention, the operation of a rebuild process at the time of a RAID configuration of the RAID 1 is explained.

Figure 19:
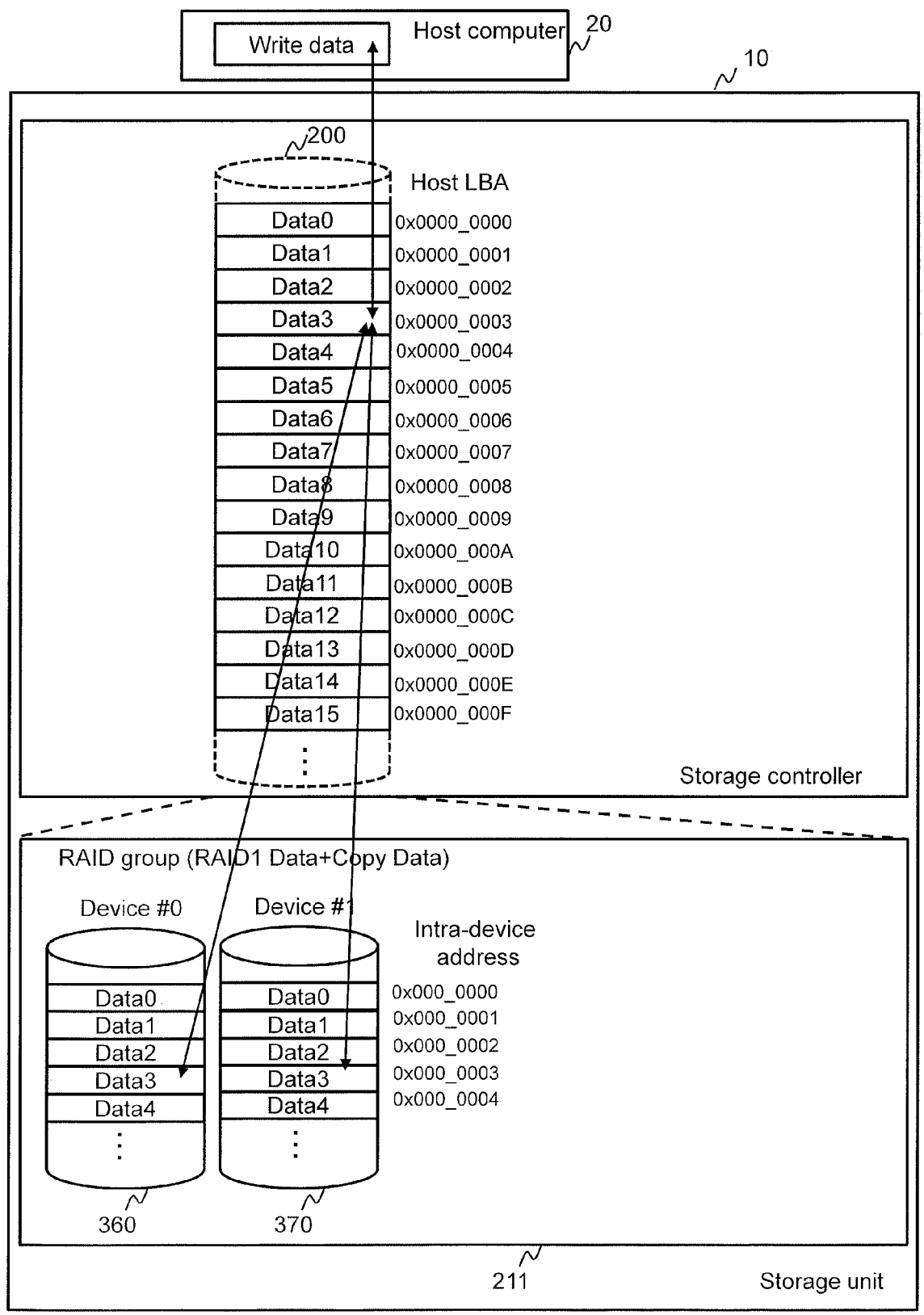
FIG. 19 shows a correspondence relation between a logical volume and a RAID group (a RAID 1).

FIG. 19 shows a relation between the VOL 200 and a RAID group 211 in this embodiment. In this embodiment, the RAID group 211 is constructed by two devices, that is, a storage device 360 and a storage device 370. When a write request with a data sire "16 KB" is sent from the host 20 to the host LEA "0x0000_0003", the same data is written in an intra-device address "0x000_0003" of the storage devices 360 and 370.

When the storage device 370 breaks down and a new storage device is coupled to the PCIe bus 180, as in the first embodiment, the storage controller 100 notifies the new storage device of RAID configuration information and instructs the new storage device to start a rebuild process. Then, the new storage device issues a read data buffer transfer instruction to a device LEA saved in the same RAID group and stores, in the FM, read data read from the device LBA. Consequently, the rebuild process is completed. Therefore, as in the first embodiment, it is possible to perform the rebuild process at high speed without imposing a load on the storage controller 100 at all.

In the third embodiment, the example of the rebuild process is explained. However, the present invention is applicable to a copy process. For example, when an address, a size, and the like are designated as copy information instead of the rebuild configuration information and a copy process start is instructed to a device, it is possible to perform the copy process without imposing a load on the storage controller 100 at all. As in the first embodiment, by providing a queue for inter-device communication and a queue for storage controller and stacking requests in the queue for inter-device communication, it is possible to realize the copy process without affecting a write request and a read request from the host.

In the explanation of the first and second embodiments, the example is explained in which data is stored in the RAID 5. However, a RAID configuration is not particularly limited long as data is stored in a data storage format capable of restoring one or a plurality of storage devices when the storage devices break down such as a RAID 1, a RAID 6, a RAID 10, and a RAID 50. By instructing RAID configuration information and a rebuild process start to a storage device in which the rebuild process is desired to be performed, it is possible to perform the rebuild process on the basis of the RAID configuration in the storage device.

The example of the four storage devices is explained. However, the number of storage devices is not limited as long as a RAID group is configured by two or more storage devices.

In this embodiment, the example is explained in which the storage controller 100 communicates with the storage devices via the PCIe bus 180. However, the present invention is not limited to this. For example, SAS or InfiniBand may be used as the PCIe bus 180. For example, an example in the case in which the SAS is used instead of the PCIe bus is explained. The I/O interface 411 shown in FIG. 7 functions as an SAS controller including a function of switching initiator and target functions. The operation in the case of the SAS is explained with reference to FIG. 12. When receiving a rebuild start instruction from the CPU 120 of the storage controller 100 together with the RAID configuration information 810, the rebuild target storage device 350 changes the function of the SAS controller from the target to the initiator. Thereafter, the storage device 350 reads data/parities from the storage devices 310 to 340 and performs the rebuild process. When the rebuild process is completed, the storage device 350 notifies the storage controller 100 of the rebuild completion and switches the SAS controller from the initiator function to the target function. In the case of the SAS, unlike the PCIe, a scheme for performing communication after coupling the initiator and the target is adopted, in the RAID configuration information 810, a device address is used instead of the device offset 816. Communication of data is performed using an intra-device address after coupling the storage controller 100 to a specific storage device using the device address. As explained above, in the case of the SAS, it is possible to perform the rebuild process as in the case of the PCIe.

In this embodiment, the example is explained in which the rebuild process is performed according to an instruction from the storage controller. However, the storage devices 310 to 340 may be inserted into a server itself to perform a process equivalent to the process of the storage controller using a program on the server.

In the embodiment, the example is explained in which there is one switch 390 of the storage device as the bus configuration. However, even a configuration in which switches 390 are coupled in multiple stages may be called the same bus configuration as long as the configuration is a bus configuration in which data communication can be performed not via the host.

REFERENCE SIGNS LIST

10 storage unit
20 host computer
100 storage controller
120 CPU
130 memory
310 storage device
320 storage device
330 storage device
340 storage device

The invention claimed is:

1. A storage unit comprising a plurality of storage devices forming a RAID group, coupled to a same bus, and configured to communicate with each other; and
   a storage controller coupled to the plurality of storage devices by a bus and configured to control the plurality of storage devices as a RAID group, wherein
   each of the plurality of storage devices includes a device controller and a storage medium that stores data,
   the plurality of storage devices are configured to store each of multiple pieces of data and parities generated on the basis of the multiple pieces of data, the multiple pieces of data and the parities being included in RAID stripes,
   the storage controller is configured to transmit a rebuild instruction to a first device controller of a first storage device, and the first device controller of the first storage device included in the RAID group, which received the rebuild instruction, is configured to transmit, to the plurality of storage devices included in the RAID group other than the first storage device, an instruction to transfer the multiple pieces of data and the parities included in the RAID stripes and restore the data corresponding to the first storage device of the RAID stripes on the basis of the transferred multiple pieces of data and the transferred parities,
   wherein the device controller of each of the plurality of storage devices is configured to receive RAID configuration information,
   wherein the RAID configuration information includes a RAID level of the RAID group, the number of the data and the number of the parities included in the RAID stripes, a size per one of the data and the parities included in the RAID stripes, and storage device identification information for uniquely identifying a storage area of each of the plurality of storage devices, and
   wherein the first device controller is configured to specify a plurality of storage devices at transmission destinations of the transfer instruction on the basis of the RAID configuration information and include, in the transfer instruction, information for designating a range in which transfer target data of the specified plurality of storage devices are stored.

2. The storage unit according to claim 1, wherein the first device controller is configured to transmit, in response to reception of a rebuild instruction, which is an instruction for restoring data of the first storage device, the transfer instruction to the plurality of storage devices included in the RAID group other than the first storage device.

3. The storage unit according to claim 1, wherein the first device controller is configured to read data from the storage medium and, when an uncorrectable error occurs in the read data, transmit, to the plurality of storage devices, an instruction to transfer the multiple pieces of data and/or the parities included in the RAID stripe corresponding to the data in which the uncorrectable error occurs and restore, on the basis of the transferred multiple pieces of data and the transferred parities, the data in which the uncorrectable error occurs.

4. The storage unit according to claim 3, wherein the first device controller is configured to store the restored data in the storage medium.

5. The storage unit according to claim 1, wherein the device controller of each of the plurality of storage devices is configured to control read of data from and write of data in the storage medium according to a data transfer instruction.

6. The storage unit according to claim 1, wherein the first device controller of the first storage device included in the RAID group is configured to transmit the restored data to the storage controller.

7. A storage unit comprising:
   a plurality of storage devices each including a device controller and a storage medium configured to store data, the plurality of storage devices being configured to communicate with each other; and
   a storage controller coupled to the plurality of storage devices by a bus and configured to control the plurality of storage devices as a RAID group, wherein
   in the plurality of storage devices, each of multiple pieces of data and parities generated on the basis of the multiple pieces of data is stored, the multiple pieces of data and the parities being included in RAID stripes,
   the storage controller is configured to transmit a rebuild instruction to a first device controller of a first storage device, and the first device controller of the first storage device included in the RAID group, which received the rebuild instruction, is configured to transmit, to the plurality of storage devices included in the RAID group other than the first storage device, an instruction to transfer the multiple pieces of data and the parities included in the RAID stripes and restore the data corresponding to the first storage device of the RAID stripes on the basis of the transferred multiple pieces of data and the transferred parities,
   wherein, the storage controller is configured to transmit, in response to coupling of the first storage device, to the first storage device, RAID configuration information including a RAID level of the RAID group, the number of the data and the number of the parities included in the RAID stripes, a size per one of the data and the parities included in the RAID stripes, and storage device identification information for uniquely identifying a storage area of each of the plurality of storage devices,
   wherein the storage controller is further coupled to a computer and configured to transmit a rebuild instruction, which is an instruction for restoring data of the first storage device, to the first storage device,
   the first device controller is configured to, when receiving the rebuild instruction, restore the data for each of the RAID stripes and transmit, to the storage controller, a rebuild completed device LBA, which is a logical storage space (LBA) of a device corresponding to the RAID stripe for which the restoration of the data is completed, and the storage controller is configured to receive a read request from the computer, when a target LBA of the read request corresponds to the first storage device, determine, on the basis of the rebuild completed device LBA, whether data of the target LBA of the read request is restored, and, when the data of the target LBA of the read request is restored, transmit a read data transfer instruction to the first storage device.

8. The storage unit according to claim 7, wherein the storage controller is configured to transmit a read data transfer instruction to the first storage device, and the first device controller of the first storage device is configured to read, from the storage medium, data designated by the read data transfer instruction and, when an uncorrectable error occurs in the read data, transmit, to the plurality of storage devices, an instruction to transfer the multiple pieces of data and/or the parities included in the RAID stripe corresponding to the data in which the uncorrectable error occurs, restore, on the basis of the transferred multiple pieces of data and the transferred parities, the data in which the uncorrectable error occurs, and transfer the restored data and error information indicating the occurrence of the uncorrectable error to the storage controller.

9. The storage unit according to claim 8, wherein the storage controller is configured to manage the number of times of the occurrence of the uncorrectable error of the first storage device on the basis of the error information and, when the number of times of the occurrence of the uncorrectable error is a predetermined value or more, notify a warning to a computer coupled to the storage controller.

10. The storage unit according to claim 7, wherein the storage controller is configured to receive a write request from the computer, when a target LBA of the write request corresponds to the first storage device, determine, on the basis of the rebuild completed device LBA, whether data of the target LBA of the write request is restored, when the data of the target LBA of the write request is not restored, generate post-update parities of a RAID stripe including the target LBA of the write request, and write the post-update parities in a second storage device in which pre-update parities are stored.

11. The storage unit according to claim 7, wherein the device controller of each of the plurality of storage devices is configured to control read of data from and write of data in the storage medium according to a data transfer instruction from the storage controller.

12. A storage device comprising:
a device controller; and
a storage medium configured to store data, wherein the device controller is coupled to a plurality of other storage devices to perform communication and configured to receive a rebuild instruction from a storage controller coupled to the plurality of storage devices by a bus, when the storage device and the plurality of other storage devices are controlled as a RAID group, store, in the storage medium, one of multiple pieces of data and parities generated on the basis of the multiple pieces of data, the multiple pieces of data and the parities being included in RAID stripes, transmit, to the plurality of other storage devices, an instruction to transfer the multiple pieces of data and the parities included in the RAID stripes, and restore, on the basis of the transferred multiple pieces of data and the transferred parities corresponding to the storage device in the RAID stripes, wherein the device controller is configured to receive RAID configuration information, the RAID configuration information includes a RAID level of the RAID group, the number of the data and the number of the parities included in the RAID stripes, a size per one of the data and the parities included in the RAID stripes, and storage device identification information for uniquely identifying a storage area of each of the plurality of storage devices, and wherein the device controller is configured to specify a plurality of storage devices at transmission destinations of the transfer instruction on the basis of the RAID configuration information and include, in the transfer instruction, information for designating a range in which transfer target data of the specified plurality of storage devices are stored.

13. The storage device according to claim 12, wherein the device controller is configured to transmit, in response to reception of a rebuild instruction, which is an instruction for restoring data of the storage device, the transfer instruction to the other plurality of storage devices included in the RAID group.

14. The storage device according to claim 12, wherein the device controller is configured to read data from the storage medium and, when an uncorrectable error occurs in the read data, transmit, to the other plurality of storage devices, an instruction to transfer the multiple pieces of data and/or the parities included in the RAID stripe corresponding to the data in which the uncorrectable error occurs and restore, on the basis of the transferred multiple pieces of data and the transferred parities, the data in which the uncorrectable error occurs.

15. The storage device according to claim 12, wherein the storage medium is a flash memory chip, and the device controller of each of the plurality of storage devices is configured to control read of data from and write of data in the flash memory chip.

* * * * *